United States Patent
Purcell et al.

(10) Patent No.: US 6,970,454 B1
(45) Date of Patent: Nov. 29, 2005

(54) SLICED CROSSBAR ARCHITECTURE WITH INTER-SLICE COMMUNICATION

(75) Inventors: Stephen Clark Purcell, Mountain View, CA (US); Scott Kimura, San Jose, CA (US)

(73) Assignee: Pasternak Solutions LLC, Los Altos, CA (US)

( * ) Notice: Subject to any disclaimer, the term of this patent is extended or adjusted under 35 U.S.C. 154(b) by 820 days.

(21) Appl. No.: 09/927,306

(22) Filed: Aug. 9, 2001

(51) Int. Cl.[7] ........................ H04L 12/56; H04Q 11/04
(52) U.S. Cl. ................ 370/355; 370/392; 370/395.42; 370/412; 370/428; 709/226; 709/238
(58) Field of Search ................ 370/230, 235, 370/351, 352, 355, 389, 392, 395.1, 395.4, 395.41, 395.42, 412, 428; 709/223, 226, 227, 229, 238, 245

(56) References Cited

U.S. PATENT DOCUMENTS

| | | | | |
|---|---|---|---|---|
| 5,191,578 A | * | 3/1993 | Lee ........................... | 370/418 |
| 5,428,607 A | * | 6/1995 | Hiller et al. ................ | 370/352 |
| 5,477,364 A | * | 12/1995 | Pearson ...................... | 398/54 |
| 6,031,842 A | * | 2/2000 | Trevitt et al. ............... | 370/412 |
| 6,310,878 B1 | * | 10/2001 | Bodnar et al. .............. | 370/396 |
| 6,501,757 B1 | * | 12/2002 | Kamaraj et al. ........ | 370/395.41 |
| 6,510,161 B2 | * | 1/2003 | Trevitt et al. ............... | 370/412 |
| 6,763,029 B2 | * | 7/2004 | Trevitt et al. ............... | 370/412 |

* cited by examiner

Primary Examiner—Alpus H. Hsu
(74) Attorney, Agent, or Firm—Townsend and Townsend and Crew LLP

(57) ABSTRACT

A method and apparatus includes identifying an address portion of a first message in an address slice of a switch, the first message associated with a first priority, the address portion of the first message including a first routing portion specifying a network resource; identifying an address portion of a second message in the address slice, the second message associated with a second priority, the address portion of the second message including a second routing portion specifying the same network resource; identifying a non-address portion of the first message in a non-address slice of the switch; identifying a non-address portion of the second message in the non-address slice, wherein neither of the non-address portions includes a routing portion specifying the network resource; selecting, independently in each slice, the same one of the first and second messages based on the first and second priorities; transferring the address portion of the selected message to the network resource specified by the routing portion of the address portion of the selected message; sending the routing portion of the address portion of the selected message from the address slice to the non-address slice; transferring the non-address portion of the selected message to the network resource specified by the routing portion of the address portion of the selected message.

32 Claims, 23 Drawing Sheets

SLICED CROSSBAR ARCHITECTURE WITH INTER-SLICE COMMUNICATION

BACKGROUND

The present invention relates generally to interconnection architecture, and particularly to interconnecting multiple processors with multiple shared memories.

Advances in the area of computer graphics algorithms have led to the ability to create realistic and complex images, scenes and films using sophisticated techniques such as ray tracing and rendering. However, many complex calculations must be executed when creating realistic or complex images. Some images may take days to compute even when using a computer with a fast processor and large memory banks. Multiple processor systems have been developed in an effort to speed up the generation of complex and realistic images. Because graphics calculations tend to be memory intensive applications, some multiple processor graphics systems are outfitted with multiple, shared memory banks. Ideally, a multiple processor, multiple memory bank system would have full, fast interconnection between the memory banks and processors. For systems with a limited number of processors and memory banks, a crossbar switch is an excellent choice for providing fast, full interconnection without introducing bottlenecks.

However, conventional crossbar-based architectures do not scale well for a graphics system with a large number of processors. Typically, the size of a crossbar switch is limited by processing and/or packaging technology constraints such as the maximum number of pins per chip. In particular, such technology constraints restrict the size of a data word that can be switched by conventional crossbar switches.

SUMMARY

In general, in one aspect, the invention features a method and apparatus. It includes identifying an address portion of a first message in an address slice of a switch, the first message associated with a first priority, the address portion of the first message including a first routing portion specifying a network resource; identifying an address portion of a second message in the address slice, the second message associated with a second priority, the address portion of the second message including a second routing portion specifying the same network resource; identifying a non-address portion of the first message in a non-address slice of the switch; identifying a non-address portion of the second message in the non-address slice, wherein neither of the non-address portions includes a routing portion specifying the network resource; selecting, independently in each slice, the same one of the first and second messages based on the first and second priorities; transferring the address portion of the selected message to the network resource specified by the routing portion of the address portion of the selected message; sending the routing portion of the address portion of the selected message from the address slice to the non-address slice; transferring the non-address portion of the selected message to the network resource specified by the routing portion of the address portion of the selected message.

Particular implementations can include one or more of the following features. Implementations include associating the first and second priorities with the first and second messages based on the ages of the first and second messages. Implementations include dividing each message to create the address portions and non-address portions; sending the address portions to the address slice; and sending the non-address portions to the non-address slice. The network resource is a memory resource. Implementations include sending the selected address portion to a further address slice; and sending the selected non-address portion to a further non-address slice. The network resource is a processor. The network resource is a crossbar.

In general, in one aspect, the invention features a method and apparatus for use in an address slice of a switch having the address slice and a non-address slice. It includes identifying an address portion of a first message, the first message associated with a first priority, the address portion of the first message including a first routing portion specifying a network resource, wherein a non-address portion of the first message resides in a non-address slice of the switch; identifying an address portion of a second message, the second message associated with a second priority, the address portion of the second message including a second routing portion specifying the same network resource, wherein a non-address portion of the second message resides in the non-address slice, wherein neither of the non-address portions includes a routing portion specifying the network resource; selecting one of the first and second messages based on the first and second priorities, wherein the second slice independently selects the same one of the first and second messages based on the first and second priorities; and transferring the address portion of the selected message to the network resource specified by the routing portion of the address portion of the selected message; sending the first and second routing portions from the address slice to the non-address slice, wherein the non-address slice sends the non-address portion of the selected message to the network resource specified by the routing portion of the address portion of the selected message.

In general, in one aspect, the invention features a method and apparatus for use in a non-address slice of a switch having the non-address slice and an address slice. It includes identifying a non-address portion of a first message, the first message associated with a first priority, wherein an address portion of the first message resides in an address slice of the switch, the address portion of the first message including a first routing portion specifying a network resource; identifying a non-address portion of a second message, the second message associated with a second priority, wherein an address portion of the second message resides in the address slice, the address portion of the second message including a second routing portion specifying the same network resource, wherein neither of the non-address portions includes a routing portion specifying the network resource; selecting one of the first and second messages based on the first and second priorities, wherein the second slice independently selects the same one of the first and second messages based on the first and second priorities; and receiving the first and second routing portions from the address slice; and transferring the non-address portion of the selected message to the network resource specified by the routing portion of the address portion of the selected message; and wherein the address slice sends the address portion of the selected message to the network resource specified by the routing portion of the address portion of the selected message.

In general, in one aspect, the invention features a method and apparatus. It includes identifying a first portion of a first message in a first slice of a switch, the first message associated with a first priority, the first portion of the first message including a first routing portion; identifying a second portion of the first message in a second slice of the switch, the second portion of the first message including a second routing portion, the first and second routing portions together specifying a network resource; identifying a first portion of a second message in the first slice, the second message associated with a second priority, the first portion of the second message including a third routing portion; identifying a second portion of the second message in the second slice, the second portion of the second message including a fourth routing portion, the third and fourth routing portions together specifying the network resource; selecting, independently in each slice, the same one of the first and second messages based on the first and second priorities; transferring the one of the first and third routing portions corresponding to the selected message from the first slice to the second slice; sending the second portion of the selected message from the second slice to the network resource specified by the combination of the one of the first and third routing portions corresponding to the selected message and the one of the second and fourth routing portions corresponding to the selected message; transferring the one of the second and fourth routing portions corresponding to the selected message from the second slice to the first slice; and sending the first portion of the selected message from the first slice to the network resource specified by the combination of the one of the first and third routing portions corresponding to the selected message and the one of the second and fourth routing portions corresponding to the selected message.

Particular implementations can include one or more of the following features. Implementations include associating the first and second priorities with the first and second messages based on the ages of the first and second messages. Implementations include dividing each message to create the first and second portions; sending the first portions to the first slice; and sending the second portions to the second slice. The network resource is a memory resource. The network resource is a processor. The network resource is a crossbar.

In general, in one aspect, the invention features a method and apparatus for use in a first slice of a switch having first and second slices. It includes identifying a first portion of a first message in the first slice, the first message associated with a first priority, the first portion of the first message including a first routing portion, wherein a second portion of the first message resides in the second slice of the switch, the second portion of the first message including a second routing portion, the first and second routing portions together specifying a network resource; identifying a first portion of a second message in the first slice, the second message associated with a second priority, the first portion of the second message including a third routing portion, wherein a second portion of the second message resides in the second slice, the second portion of the second message including a fourth routing portion, the third and fourth routing portions together specifying the network resource; selecting one of the first and second messages based on the first and second priorities, wherein the second slice independently selects the same one of the first and second messages based on the first and second priorities; receiving the one of the second and fourth routing portions corresponding to the selected message from the second slice; sending the first portion of the selected message to the network resource specified by the combination of the one of the first and third routing portions corresponding to the selected message and the one of the second and fourth routing portions corresponding to the selected message; and transferring the one of the first and third routing portions corresponding to the selected message to the second slice; and wherein the second slice sends the second portion of the selected message to the network resource specified by the combination of the one of the first and third routing portions corresponding to the selected message and the one of the second and fourth routing portions corresponding to the selected message.

Advantages that can be seen in implementations of the invention include one or more of the following. The architectures disclosed herein permit very large data words to be switched by a number of crossbar switch slices operating in parallel. A very small amount of inter-slice communication permits larger data words to be used by reducing redundant data handling among slices.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Introduction

Figure 1:
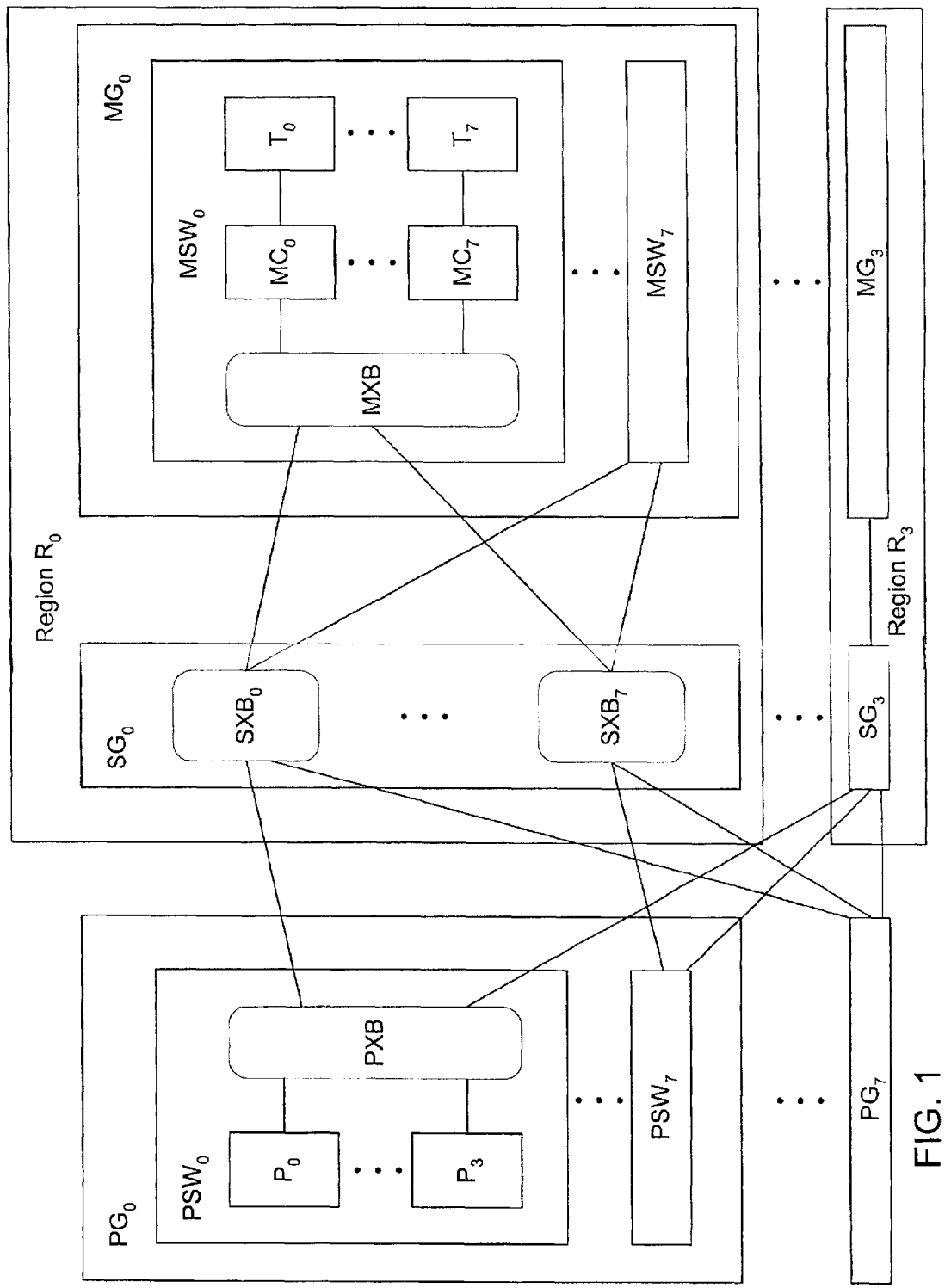
FIG. 1 shows a plurality of processor groups connected to a plurality of regions.

As shown in FIG. 1, a plurality of processor groups $PG_0$ through $PG_7$ is connected to a plurality of regions $R_0$ through $R_3$. Each region R includes a memory group MG connected to a switch group SG. For example, region $R_0$ includes a memory group $MG_0$ connected to a switch group $SG_0$, while region $R_3$ includes a memory group $MG_3$ connected to a switch group $SG_3$.

Each processor group PG includes a plurality of processor switches $PSW_0$ through $PSW_7$. Each processor switch PSW includes a plurality of processors $P_0$ through $P_3$. Each processor P is connected to a processor crossbar PXB. In one implementation, each of processors $P_0$ through $P_3$ performs a different graphics rendering function. In one implementation, $P_0$ is a triangle processor, $P_1$ is a triangle intersector, $P_2$ is a ray processor, and $P_3$ is a grid processor.

Each switch group SG includes a plurality of switch crossbars $SXB_0$ through $SXB_7$. Each processor crossbar PXB is connected to one switch crossbar SXB in each switch group SG. Each switch crossbar SXB in a switch group SG is connected to a different processor crossbar PXB in a processor group PG. For example, the processor crossbar PXB in processor switch $PSW_0$ is connected to switch crossbar $SXB_0$ in switch group $SG_0$, while the processor crossbar in processor switch $PSW_7$ is connected to switch crossbar $SXB_7$ in switch group $SG_0$.

Each memory switch MSW includes a plurality of memory controllers $MC_0$ through $MC_7$. Each memory controller MC is connected to a memory crossbar MXB by an internal bus. Each memory controller MC is also connected to one of a plurality of memory tracks $T_0$ through $T_7$. Each memory track T includes a plurality of memory banks. Each memory track T can be implemented as a conventional memory device such as a SDRAM.

Each memory group MG is connected to one switch group SG. In particular, each memory crossbar MXB in a memory group MG is connected to every switch crossbar SXB in the corresponding switch group SG.

Processor crossbars PXB provide full crossbar interconnection between processors P and switch crossbars SXB. Memory crossbars MXB provide full crossbar interconnection between memory controllers MC and switch crossbars SXB. Switch crossbars SXB provide full crossbar interconnection between processor crossbars PXB and memory crossbars MXB.

In one implementation, each of processor switches PSW, memory switches MSW and switch crossbars SXB is fabricated as a separate semiconductor chip. In one implementation, each processor switch PSW is fabricated as a single semiconductor chip, each switch crossbar SXB is fabricated as two or more semiconductor chips that operate in parallel, each memory crossbar MXB is fabricated as two or more semiconductor chips that operate in parallel, and each memory track T is fabricated as a single semiconductor chip. One advantage of each of these implementations is that the number of off-chip interconnects is minimized. Such implementations are disclosed herein and in a copending patent application entitled "SLICED CROSSBAR ARCHITECTURE WITH NO INTER-SLICE COMMUNICATION," serial number (TBS), filed (TBS), attorney docket number 19(BLV004001).

Slice Architecture

Figure 2:
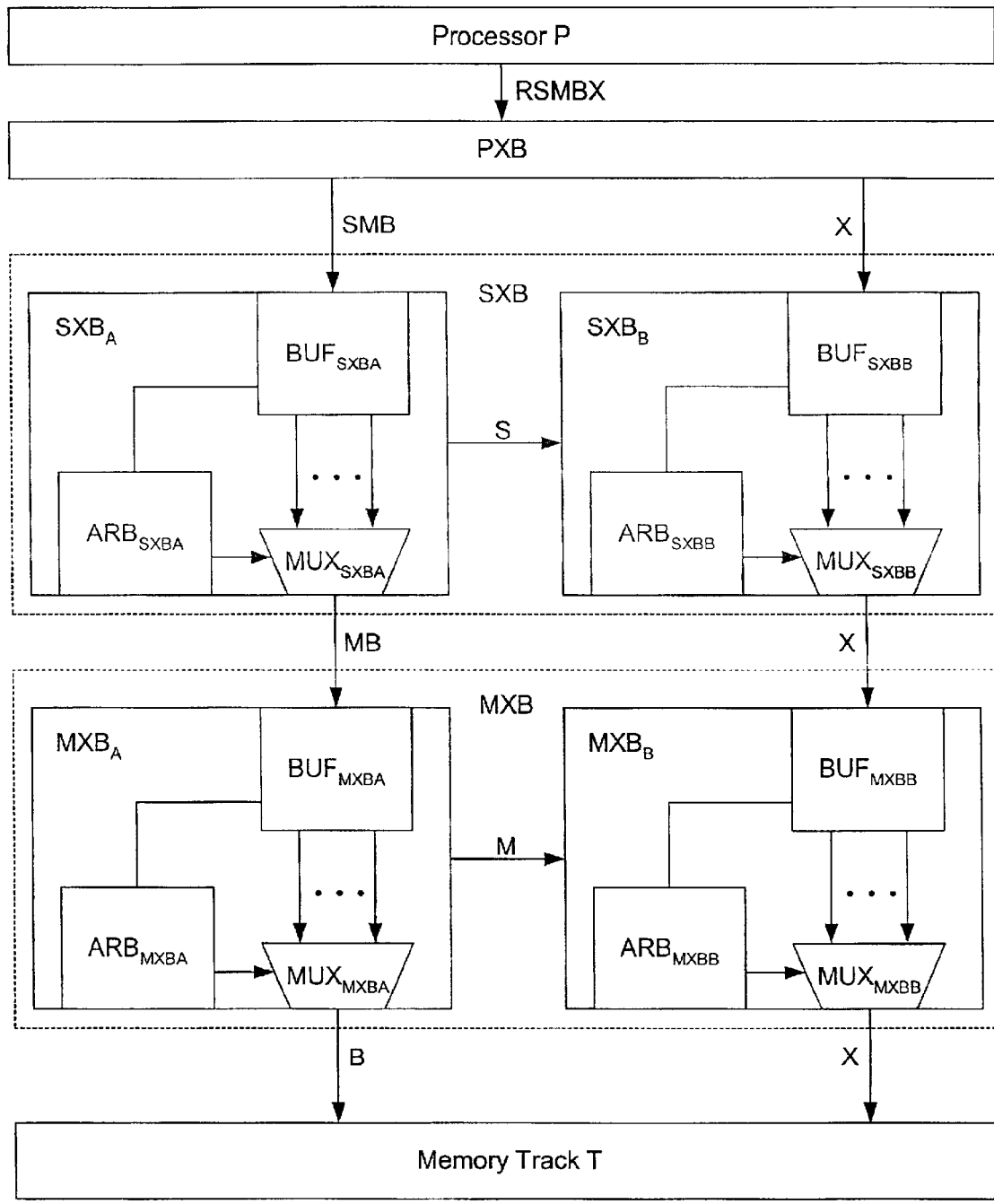
FIG. 2 illustrates one implementation where address information is not provided to every slice of a switch.

FIG. 2 illustrates one implementation where address information is not provided to every slice of a switch The slices that receive address information are referred to herein as "address slices" and the slices that do not receive address information are referred to herein as "non-address slices." Referring to FIG. 2, a processor crossbar PXB, a switch crossbar SXB and a memory crossbar MXB pass messages such as memory transactions from a processor P to a memory track T. Switch crossbar SXB includes an address slice $SXB_A$ and a non-address slice $SXB_B$. Slice $SXB_A$ includes a buffer $BUF_{SXBA}$, a multiplexer $MUX_{SXBA}$, and a arbiter $ARB_{SXBA}$. Slice $SXB_B$ includes a buffer $BUF_{SXBB}$, a multiplexer $MUX_{SXBB}$, and an arbiter $ARB_{SXBB}$. Memory crossbar MXB includes an address slice $MXB_A$ and a non-address slice $MXB_B$. Slice $MXB_A$ includes a buffer $BUF_{MXBA}$, a multiplexer $MUX_{MXBA}$, and a arbiter $ARB_{MXBA}$. Slice $MXB_B$ includes a buffer $BUF_{MXBB}$, a multiplexer $MUX_{MXBB}$, and an arbiter $ARB_{MXBB}$. Arbiters ARB can be implemented using conventional Boolean logic devices.

In other implementations, each of crossbars SXB and MXB includes more than two slices. In one implementation, crossbars SXB and MXB also send messages from memory track T to processor P using the techniques described below. After reading this description, these implementations and techniques will be apparent to one skilled in the relevant arts.

Processor P sends a message RSMBX to processor crossbar PXB. Processor crossbar PXB sends messages to switch crossbar SXB by sending a portion of the message to each of slices $SXB_A$ and $SXB_B$.

One implementation includes multiple switch crossbars SXB. Message RSMBX includes a routing portion R that is the address of switch crossbar SXB. In one implementation, processor crossbar PXB discards any routing information that is no longer needed. For example, routing information R is the address of switch crossbar SXB, and is used to route message SMBX to switch crossbar SXB. Then routing information R is no longer needed and so is discarded.

Referring to FIG. 2, PXB divides message SMBX into an address portion SMB and a non-address portion X. Either or both of address portion SMB and non-address portion X can include data. Processor crossbar PXB sends address portion SMB to address slice $SXB_A$, and sends non-address portion X to non-address slice $SXB_B$. Address portion SMB specifies a network resource such as memory track T. In one implementation, address portion SMB constitutes the address of the network resource. Referring to FIG. 2, address portion SMB constitutes the address of memory track T In other implementations, the network resource can be a switch, a network node, a bus, a processor, and tie like.

Each switch crossbar SXB stores each received message portion in a buffer $BUF_{SXB}$. For example, switch crossbar address slice $SXB_A$ stores address portion SMB in buffer $BUF_{SXBA}$ and switch crossbar $SXB_B$ stores non-address portion X in buffer $BUF_{SXBB}$. Each message portion in buffer $BUF_{SXBA}$ is assigned a priority with respect to the other message portions in buffer $BUF_{SXBA}$. Each message portion in buffer $BUF_{SXBB}$ is assigned a priority with respect to the other message portions in buffer $BUF_{SXBB}$. In one implementation, each message is assigned a priority based on time of arrival at the buffer. In one implementation, each of buffers $BUF_{SXBA}$ and $BUF_{SXBB}$ is implemented as a queue, and the priority of each message is determined by its position in the queue.

Figure 3:
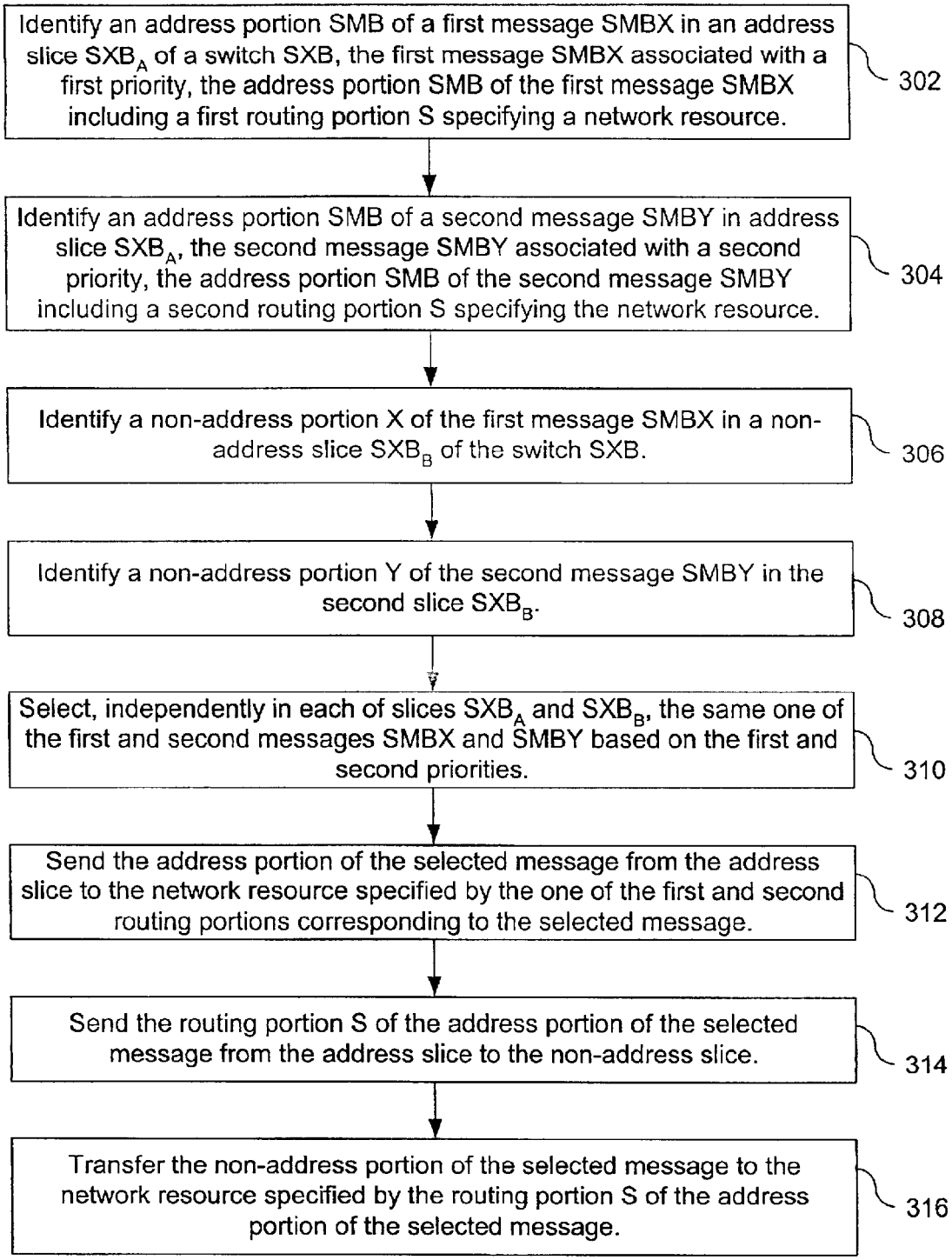
FIG. 3 illustrates an operation according to one implementation.

FIG. 3 illustrates an operation of arbiters $ARB_{SXBA}$ and $ARB_{SXBB}$ according to one implementation. Assume that switch crossbar SXB has received two messages SMBX and SMBY such that buffer $BUF_{SXBA}$ contains two address portions SMB, and buffer $BUF_{SXBB}$ contains two non-address portions X and Y.

Arbiter $ARB_{SXBA}$ identifies each address portion SMB and the priority associated with that address portion SMB (steps 302 and 304). Address portions SMB include a routing portion S specifying memory crossbar MXB.

Arbiter $ARB_{SXBB}$ identifies non-address portion X and the priority associated with non-address portion X (step 306). Arbiter $ARB_{SXBB}$ identifies non-address portion Y and the priority associated with non-address portion Y (step 308). Neither of non-address portions X and Y includes a routing portion specifying memory crossbar MXB.

Both messages SMBX and SMBY specify the same memory resource (memory crossbar MXB). Accordingly, arbiter $ARB_{SXBA}$ selects the message having the higher priority. Arbiter $ARB_{SXBB}$ employs the same priority scheme as arbiter $ARB_{SXBA}$, and so independently selects the same message. Assume that message SMBX has a higher priority than message SMBY. Accordingly, each of arbiters $ARB_{SXBA}$ and $ARB_{SXBB}$ independently selects message SMBX (step 310).

In one implementation, switch crossbar SXB retains any routing portion that is no longer needed. For example, routing portion S is the address of memory crossbar MXB, and is used to route message portions MB and X to memory crossbar MXB. Then routing information S is no longer needed and so is retained.

Arbiter $ARB_{SXBA}$ causes multiplexer $MUX_{SXBA}$ to gate address portion MB to memory crossbar MXB (step 312). Non-address portion X does not include a routing portion specifying the network resource. Accordingly, address slice $SXB_A$ sends routing portion S of the address portion SMB of the selected message to non-address slice $SXB_B$ (step 314). Arbiter $ARB_{SXBB}$ causes multiplexer $MUX_{SXBB}$ to gate non-address portion X to memory crossbar MXB (step 316).

Each memory crossbar MXB stores each received message portion in a buffer $BUF_{MXB}$. For example, memory crossbar address slice $MXB_A$ stores message portion $MBX_1$ in buffer $BUF_{MXBA}$ and memory crossbar non-address slice $MXB_B$ stores message portion $MBX_2$ in buffer $BUF_{MXBB}$. Each message portion in buffer $BUF_{MXBA}$ is assigned a priority with respect to the other message portions in buffer $BUF_{MXBA}$. Each message portion in buffer $BUF_{MXBB}$ is assigned a priority with respect to the other message portions in buffer $BUF_{MXBB}$. In one implementation, each message portion is assigned a priority based on time of arrival at the buffer. In one implementation, each of buffers $BUF_{MXBA}$ and $BUF_{MXBB}$ is implemented as a queue, and the priority of each message is determined by its position in the queue.

Figure 4:
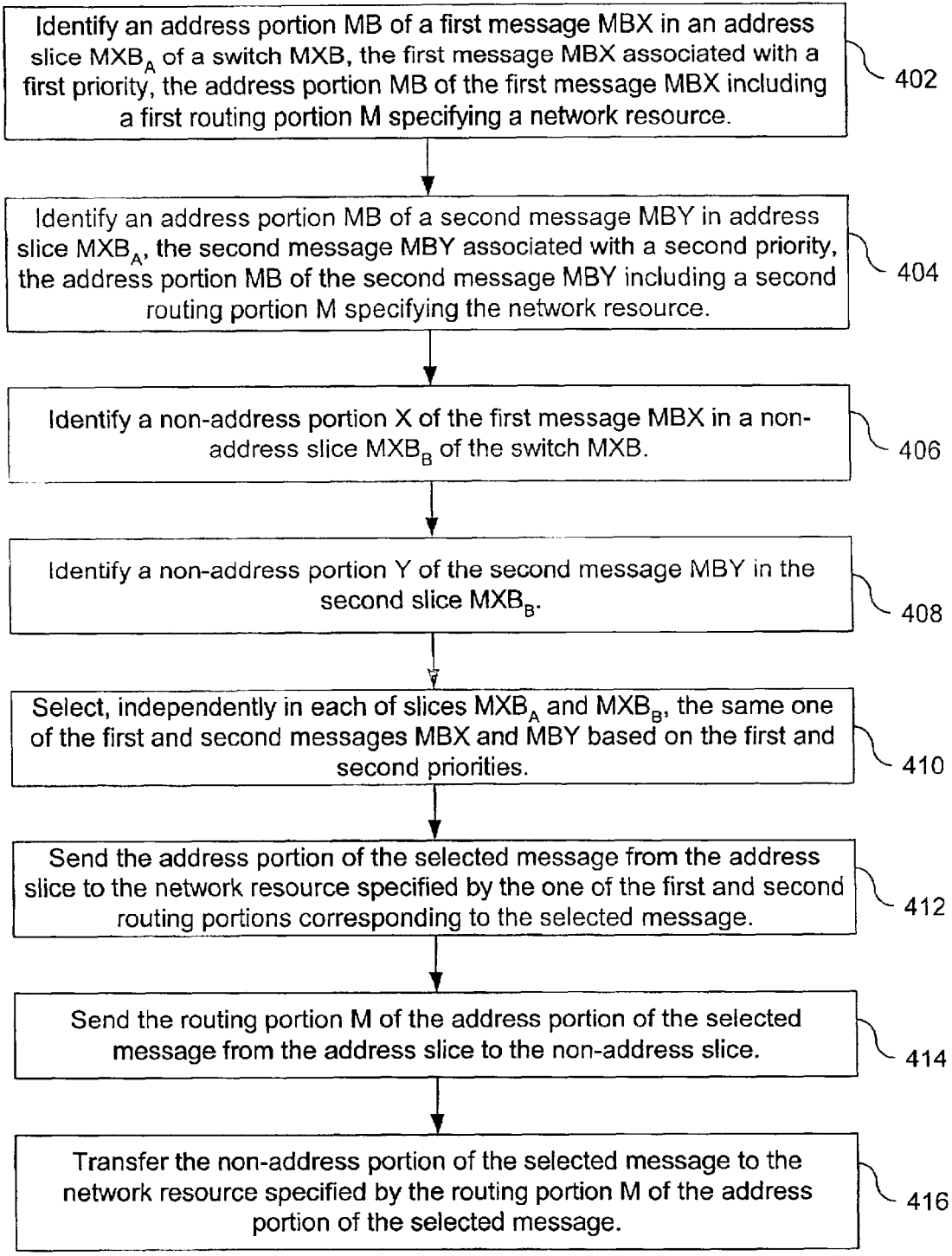
FIG. 4 illustrates an operation according to another implementation.

FIG. 4 illustrates an operation of arbiters $ARB_{MXBA}$ and $ARB_{MXBB}$ according to one implementation. Assume that memory crossbar MXB has received two messages MBX and MBY such that buffer $BUF_{MXBA}$ contains two address portions MB, and buffer $BUF_{MXBB}$ contains two non-address portions X and Y.

Arbiter $ARB_{MXBA}$ identifies address portion $MB_1$ and the priority associated with address portion $MB_1$ (step 402). Arbiter $ARB_{MXBA}$ identifies address portion $MB_2$ and the priority associated with address portion $MB_2$ (step 404).

One implementation includes multiple memory tracks T. The routing portions B of address portions MB of message portions $MBX_1$ and $MBX_2$ include a routing portion M identifying the same memory track T. Arbiter $ARB_{MXBB}$ identifies non-address portion X and the priority associated with non-address portion X (step 406). Arbiter $ARB_{MXBB}$ identifies non-address portion Y and the priority associated with non-address portion Y (step 408). Neither of non-address portions X and Y includes a routing portion specifying memory track T.

Both messages MBX and MBY specify the same memory resource (memory track T). Accordingly, arbiter $ARB_{MXBA}$ selects the message having the higher priority. Arbiter $ARB_{MXBB}$ employs the same priority scheme as arbiter $ARB_{MXBA}$, and so independently selects the same message. Assume that message SMBX has a higher priority than message SMBY. Accordingly, each of arbiters $ARB_{MXBA}$ and $ARB_{MXBB}$ independently selects message MBX (step 410).

In one implementation, memory crossbar MXB retains any routing portion that is no longer needed. For example, routing portion M is the address of memory track T, and is used to route message portions B and X to memory track T. Then routing information M is no longer needed and so is retained.

Arbiter $ARB_{MXBA}$ causes multiplexer $MUX_{MXBA}$ to gate address portion B to memory track T (step 412). Non-address portion X does not include a routing portion specifying the network resource. Accordingly, address slice $MXB_A$ sends routing portion M of the address portion MB of the selected message to non-address slice $MXB_B$. Arbiter $ARB_{MXBB}$ causes multiplexer $MUX_{MXBB}$ to gate non-address portion X to memory track T (step 414).

Figure 5:
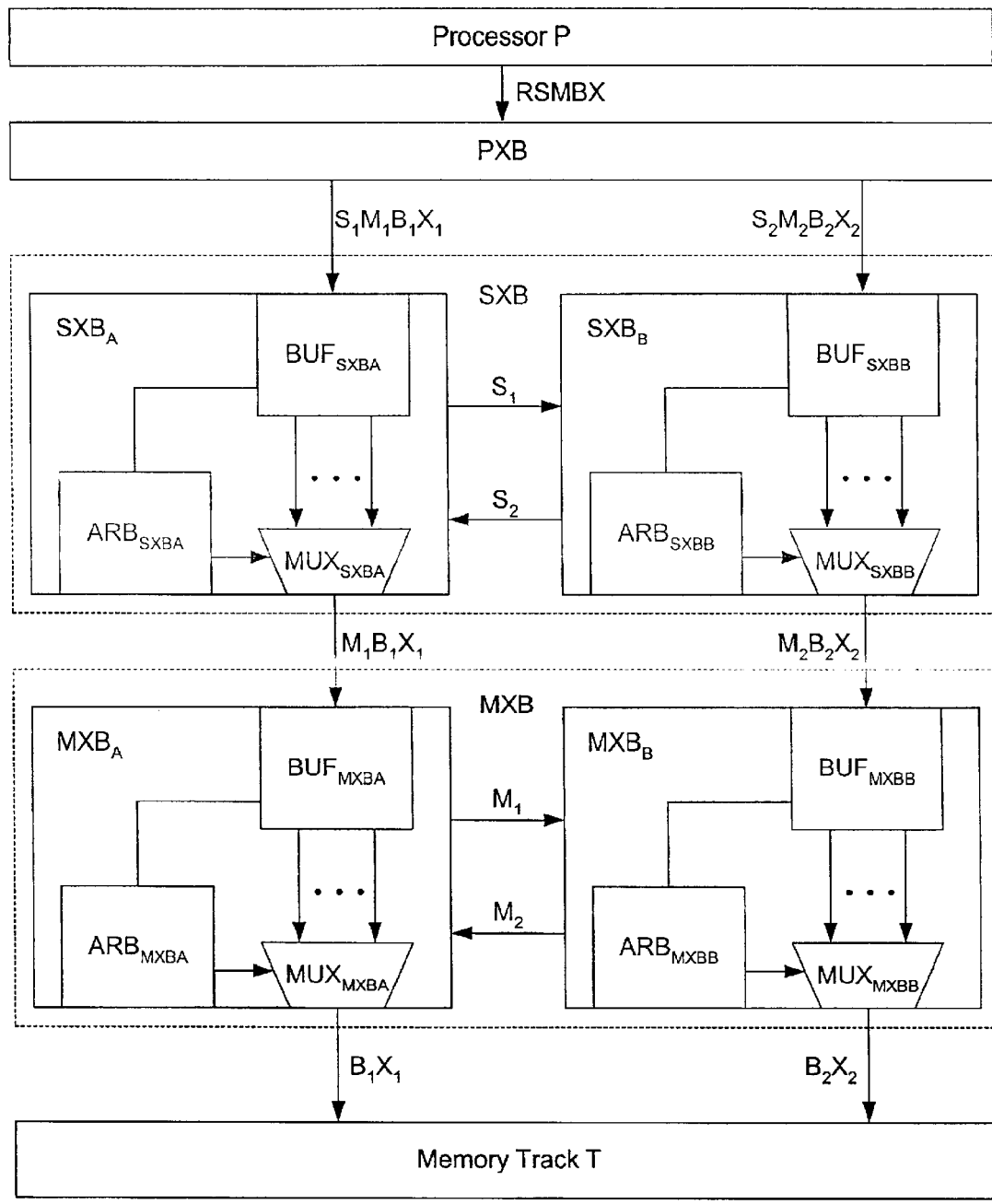
FIG. 5 illustrates one implementation where address information is distributed across multiple slices of a switch.

FIG. 5 illustrates one implementation where address information is distributed across multiple slices of a switch. Referring to FIG. 5, a processor crossbar PXB, a switch crossbar SXB and a memory crossbar MXB pass messages such as memory transactions from a processor P to a memory track T. Switch crossbar SXB includes an address slice $SXB_A$ and a non-address slice $SXB_B$. Slice $SXB_A$ includes a buffer $BUF_{SXBA}$, a multiplexer $MUX_{SXBA}$, and a arbiter $ARB_{SXBA}$. Slice $SXB_B$ includes a buffer $BUF_{SXBB}$, a multiplexer $MUX_{SXBB}$, and an arbiter $ARB_{SXBB}$. Memory crossbar MXB includes an address slice $MXB_A$ and a non-address slice $MXB_B$. Slice $MXB_A$ includes a buffer $BUF_{MXBA}$, a multiplexer $MUX_{MXBA}$, and a arbiter $ARB_{MXBA}$. Slice $MXB_B$ includes a buffer $BUF_{MXBB}$, a multiplexer $MUX_{MXBB}$, and an arbiter $ARB_{MXBB}$. Arbiters ARB can be implemented using conventional Boolean logic devices.

In other implementations, each of crossbars SXB and MXB includes more than two slices. In one implementation, crossbars SXB and MXB also send messages from memory track T to processor P using the techniques described below. After reading thus description, these implementations and techniques will be apparent to one skilled in the relevant arts.

Processor P sends a message RSMBX to processor crossbar PXB Processor crossbar PXB sends messages to switch crossbar SXB by sending a portion of the message to each of slices $SXB_A$ and $SXB_B$. One implementation includes multiple switch crossbars SXB. Message RSMBX includes a routing portion R that is the address of switch crossbar SXB. In one implementation, processor crossbar PXB discards any routing information that is no longer needed. For example, routing information R is the address of switch crossbar SXB, and is used to route message SMBX to switch crossbar SXB. Then routing information R is no longer needed and so is discarded.

Referring to FIG. 5, PXB divides message SMBX into a portion $S_1M_1B_1X_1$ and a portion $S_2M_2B_2X_2$. Processor crossbar PXB sends portion $S_1M_1B_1X_1$ to slice $SXB_A$, and sends portion $S_2M_2B_2X_2$ to slice $SXB_B$. Portion $S_1M_1B_1$ forms part of an address SMB for message SMBX, while portion $S_2M_2B_2X_2$ forms the other portion of address SMB. Address SMB specifies a network resource such as memory track T. In one implementation, address portion SMB constitutes the address of the network resource. Referring to FIG. 5, address portion SMB constitutes the address of memory track T.

Each switch crossbar SXB stores each received message portion in a buffer $BUF_{SXB}$. For example, switch crossbar slice $SXB_A$ stores portion $S_1M_{12}B_1X_1$ in buffer $BUF_{SXBA}$ and switch crossbar $SXB_B$ stores portion $S_2M_2B_2X_2$ in buffer $BUF_{SXBB}$. Each message portion in buffer $BUF_{SXBA}$ is assigned a priority with respect to the other message portions in buffer $BUF_{SXBA}$. Each message portion in buffer $BUF_{SXBB}$ is assigned a priority with respect to the other message portions in buffer $BUF_{SXBB}$. In one implementation, each message portion is assigned a priority based on time of arrival at the buffer. In one implementation, each of buffers $BUF_{SXBA}$ and $BUF_{SXBB}$ is implemented as a queue, and the priority of each message is determined by its position in the queue.

Figure 6A:
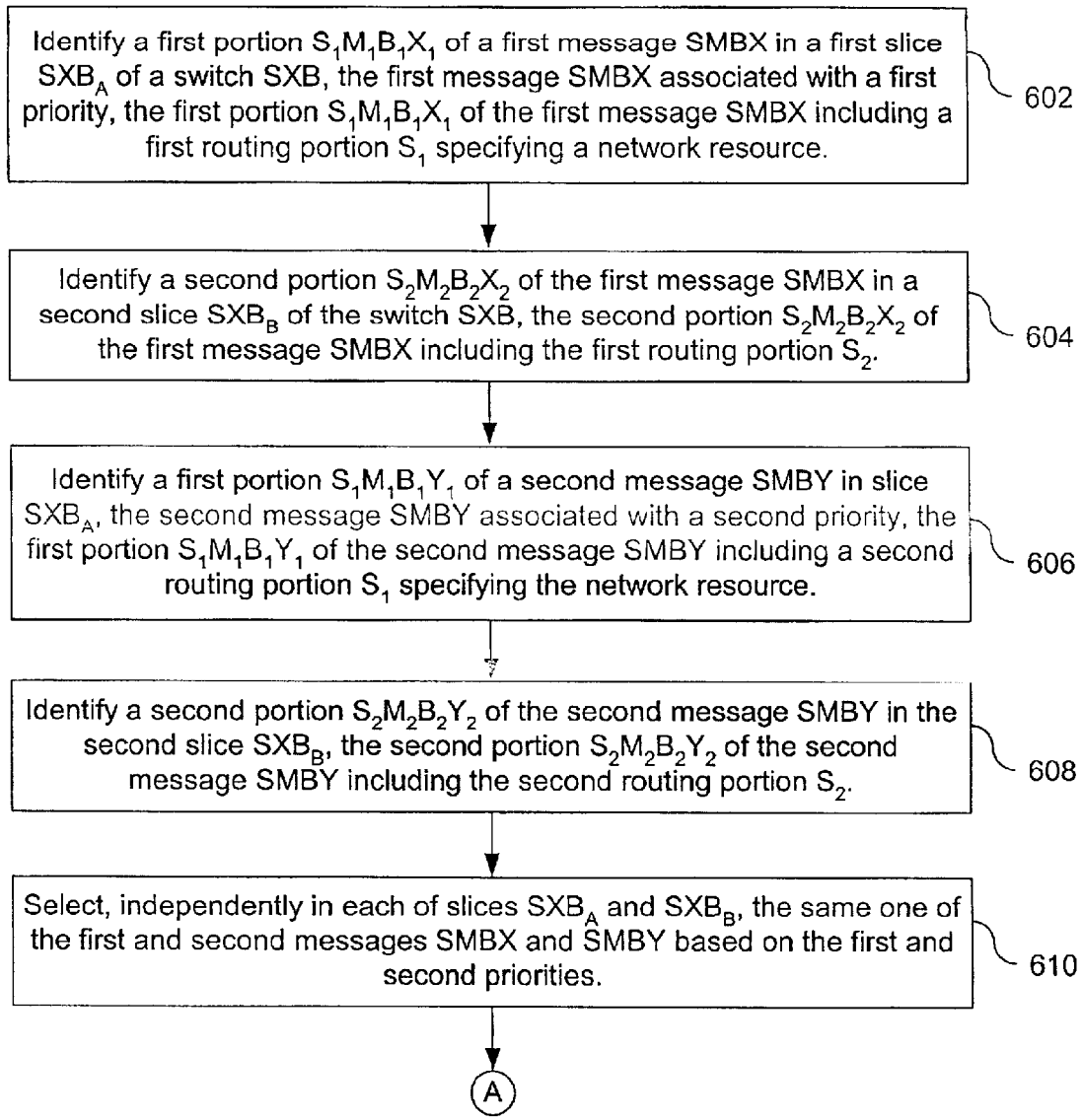
FIGS. 6A and 6B illustrate an operation according to one implementation.
Figure 6B:
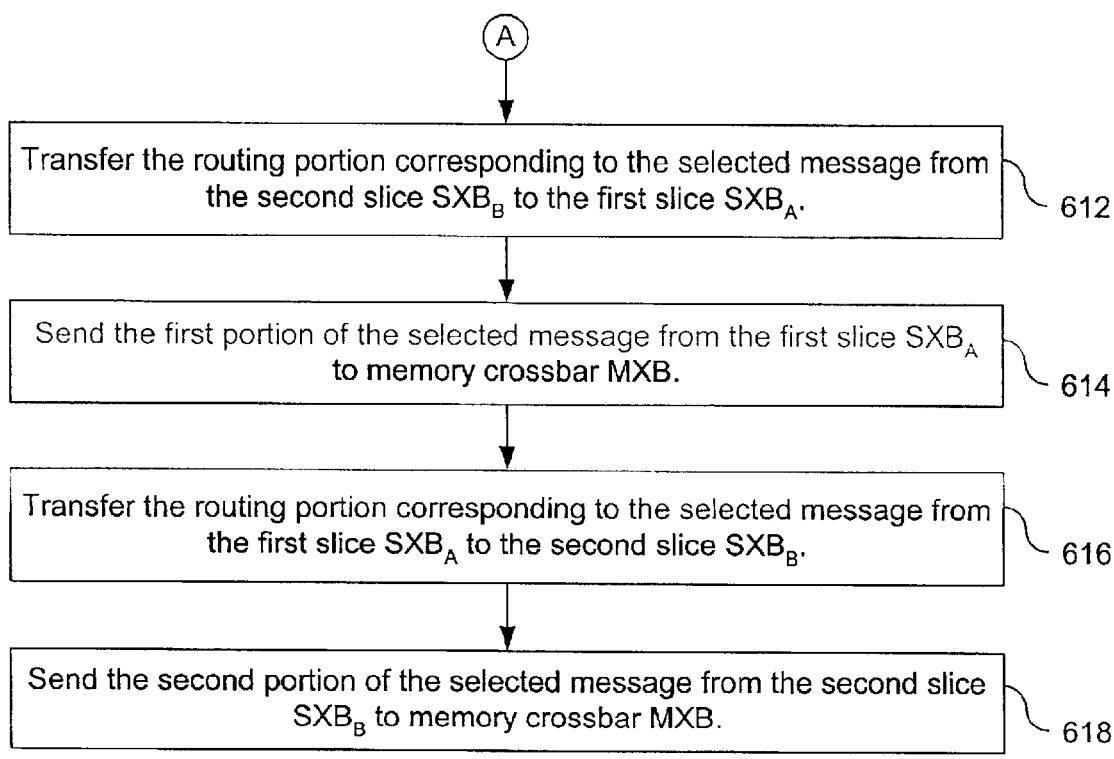

FIGS. 6A and 6B illustrate an operation of arbiters $ARB_{SXBA}$ and $ARB_{SXBB}$ according to one implementation. Assume that switch crossbar SXB has received two messages SMBX and SMBY such that buffer $BUF_{SXBA}$ contains two portions $S_1M_1B_1X_1$ and $S_1M_1B_1Y_1$, and buffer $BUF_{SXBB}$ contains two portions $S_2M_2B_2X_2$ and $S_2M_2B_2Y_2$.

Arbiter $ARB_{SXBA}$ identifies portion $S_1M_1B_1X_1$ and the priority associated with portion $S_1M_1B_1X_1$ (step 602). Arbiter $ARB_{SXBB}$ identifies portion $S_2M_2B_2X_2$ and the priority associated with portion $S_2M_2B_2X_2$ (step 604). Portion $S_1M_1B_1X_1$ includes a routing portion $S_1$ Portion $S_2M_2B_2X_2$ includes a routing portion $S_2$. Together routing portions $S_1$ and $S_2$ form a routine portion S specifying memory crossbar NXB.

Arbiter $ARB_{SXBA}$ identifies portion $S_1M_1B_1Y_1$ and the priority associated with portion $S_1M_1B_1Y_1$ (step 606). Arbiter $ARB_{SXBB}$ identifies portion $S_2M_2B_2Y_2$ and the priority associated with portion $S_2M_2B_2Y_2$ (step 608). Portion $S_1M_1B_1Y_1$ includes a routing portion $S_1$. Portion $S_2M_2B_2Y_2$ includes a routing portion $S_2$. Together routing portions $S_1$ and $S_2$ form a routing portion S specifying memory crossbar MXB.

Both messages SMBX and SMBY specify the same memory resource (memory crossbar MXB). Accordingly, arbiter $ARB_{SXBA}$ selects the message having the higher priority. Arbiter $ARB_{SXBB}$ employs the same priority scheme as arbiter $ARB_{SXBA}$, and so independently selects the same message. Assume that message SMBX has a higher priority than message SMBY. Accordingly, each of arbiters $ARB_{SXBA}$ and $ARB_{SXBB}$ independently selects message SMBX (step 610).

Portion $S_1M_1B_1X_1$ does not include a complete address for memory crossbar MXB. Accordingly, address slice $SXB_B$ sends routing portion $S_2$ of the address portion SMB of the selected message SMBX to slice $SXB_A$ (step 612).

In one implementation, switch crossbar SXB retains any routing portion that is no longer needed. For example, routing portion $S_1$ is part of the address of memory crossbar MXB, and is used to route message portion $M_1B_1X_1$ to memory crossbar MXB. Then routing portion $S_1$ is no longer needed and so is retained. Arbiter $AR_{SXBA}$ causes multiplexer $MUX_{SXBA}$ to gate portion $M_1B_1X_1$ to memory crossbar MXB (step 614).

Similarly, portion $S_2M_2B_2X_2$ does not include a complete address for memory crossbar MXB. Accordingly, address slice $SXB_A$ sends routing portion $S_1$ of the address portion SMB of the selected message SMBX to slice $SXB_B$ (step 616).

In one implementation, switch crossbar SXB retains any routing portion that is no longer needed. For example, routing portion $S_2$ is part of the address of memory crossbar MXB, and is used to route message portion $M_2B_2X_2$ to memory crossbar MXB. Then routing portion $S_2$ is no longer needed and so is retained. Arbiter $ARB_{SXBB}$ causes multiplexer $MUX_{SXBB}$ to gate portion $M_2B_2X_2$ to memory crossbar MXB (step 618).

Each memory crossbar MXB stores each received message portion in a buffer $BUF_{MXB}$. For example, memory crossbar slice $MXB_A$ stores portion $M_1B_1X_1$ in buffer $BUF_{MXBA}$ and memory crossbar $MXB_B$ stores portion $M_2B_2X_2$ in buffer $BUF_{MXBB}$. Each message portion in buffer $BUF_{MXBA}$ is assigned a priority with respect to the other message portions in buffer $BUF_{MXBA}$. Each message portion in buffer $BUF_{MXBB}$ is assigned a priority with respect to the other message portions in buffer $BUF_{MXBB}$. In one implementation, each message portion is assigned a priority based on time of arrival at the buffer. In one implementation, each of buffers $BUF_{MXBA}$ and $BUF_{MXBB}$ is implemented as a queue, and the priority of each message is determined by its position in the queue.

Figure 7A:
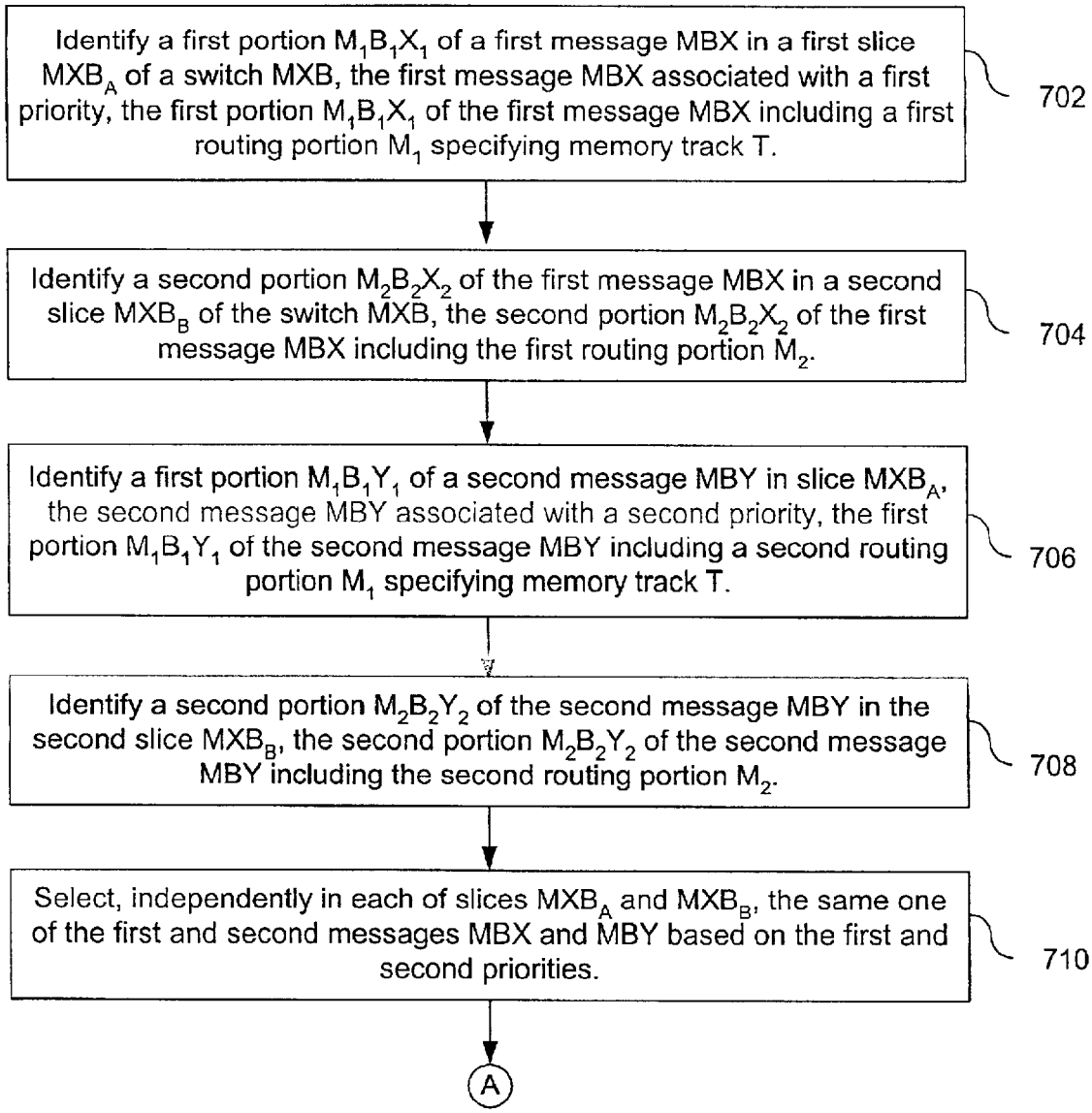
FIGS. 7A and 7B illustrate an operation according to one implementation.
Figure 7B:
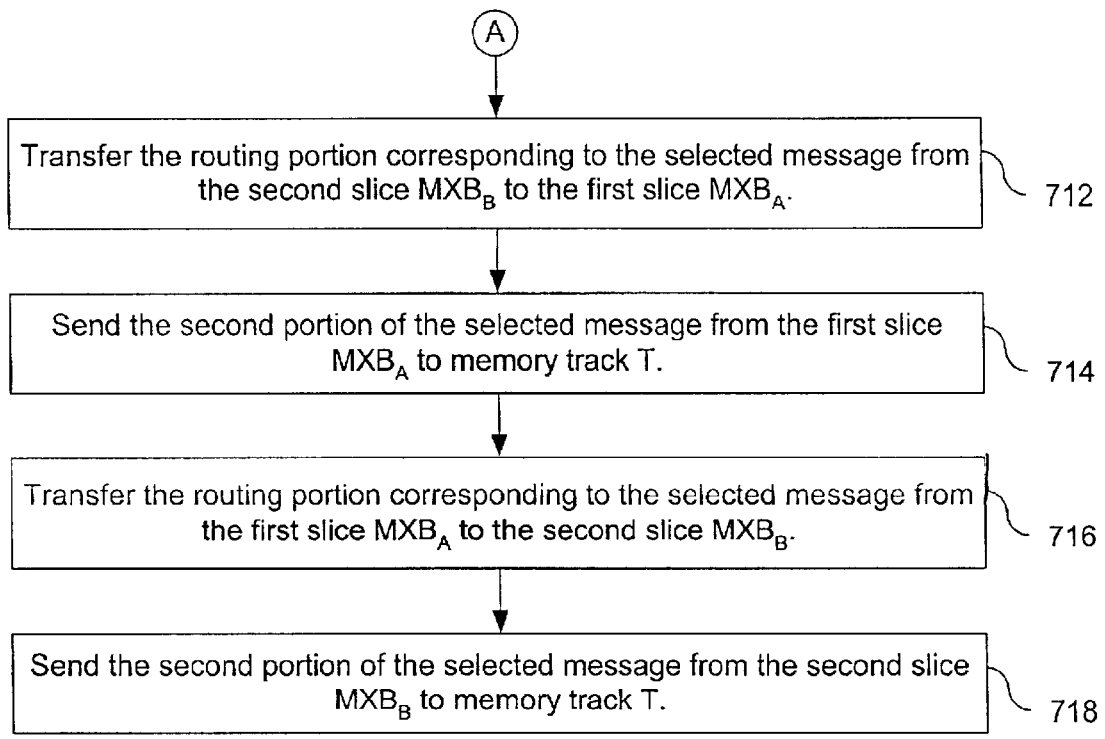

FIGS. 7A and 7B illustrate an operation of arbiters $ARB_{MXBA}$ and $ARB_{MXBB}$ according to one implementation. Assume that memory crossbar MXB has received two messages MBX and MBY such that buffer $BUF_{MXBA}$ contains two portions $M_1B_1X_1$ and $M_1B_1Y_1$, and buffer $BUF_{MXBB}$ contains two portions $M_2B_2X_2$ and $M_2B_2Y_2$.

Arbiter $ARB_{MXBA}$ identifies portion $M_1B_1X_1$ and the priority associated with portion $M_1B_1X_1$ (step 702). Arbiter $ARB_{MXBB}$ identifies portion $M_2B_2X_2$ and the priority associated with portion $M_2B_2X_2$ (step 704).

One implementation includes multiple memory tracks T. Portion $M_1B_1X_1$ includes a routing portion $M_1$. Portion $M_2B_2X_2$ includes a routing portion $M_2$. Together routing portions $M_1$ and $M_2$ form a routing portion M specifying memory crossbar MXB.

Arbiter $ARB_{MXBA}$ identifies portion $M_1B_1Y_1$ and the priority associated with portion $M_1B_1Y_1$ (step 706). Arbiter $ARB_{MXBB}$ identifies portion $M_2B_2Y_2$ and the priority associated with portion $M_2B_2Y_2$ (step 708). Portion $M_1B_1Y_1$ includes a routing portion $M_1$. Portion $M_2B_2Y_2$ includes a routing portion $M_2$. Together routing portions $M_1$ and $M_2$ form a routing portion M specifying memory crossbar MXB.

Both messages MBX and MBY specify the same memory resource (memory track T). Accordingly, arbiter $ARB_{MXBA}$ selects the message having the higher priority. Arbiter $ARB_{MXBA}$ employs the same priority scheme as arbiter $ARB_{MXBA}$, and so independently selects the same message. Assume that message MBX has a higher priority than message MBY. Accordingly, each of arbiters $ARB_{MXBA}$ and $ARB_{MXBA}$ independently selects message MBX (step 710).

Portion $M_1B_1X_1$ does not include a complete address for memory track T. Accordingly, address slice $MXB_B$ sends routing portion $M_2$ of the address portion MB of the selected message MBX to slice $MXB_A$ (step 712).

In one implementation, memory crossbar MXB retains any routing portion that is no longer needed. For example, routing portion M is the address of memory track T, and is used to route message portion $B_1X_1$ to memory track T. Then routing information M is no longer needed and so is retained. Arbiter $ARB_{MXBA}$ causes multiplexer $MUX_{MXBA}$ to gate portion $B_1X_1$ to memory track T (step 714).

Similarly, portion $M_2B_2X_2$ does not include a complete address for memory track T. Accordingly, address slice $MXB_A$ sends routing portion M1 of the address portion MB of the selected message MBX to slice $MXB_B$ (step 716).

In one implementation, memory crossbar MXB retains any routing portion that is no longer needed. For example, routing portion M is the address of memory track T, and is used to route message portion $B_2X_2$ to memory track T. Then routing information M is no longer needed and so is retained. Arbiter $ARB_{MXBB}$ causes multiplexer $MUX_{MXBB}$ to gate portion $M_2B_2X_2$ to memory track T (step 718).

Architecture Overview

Figure 8:
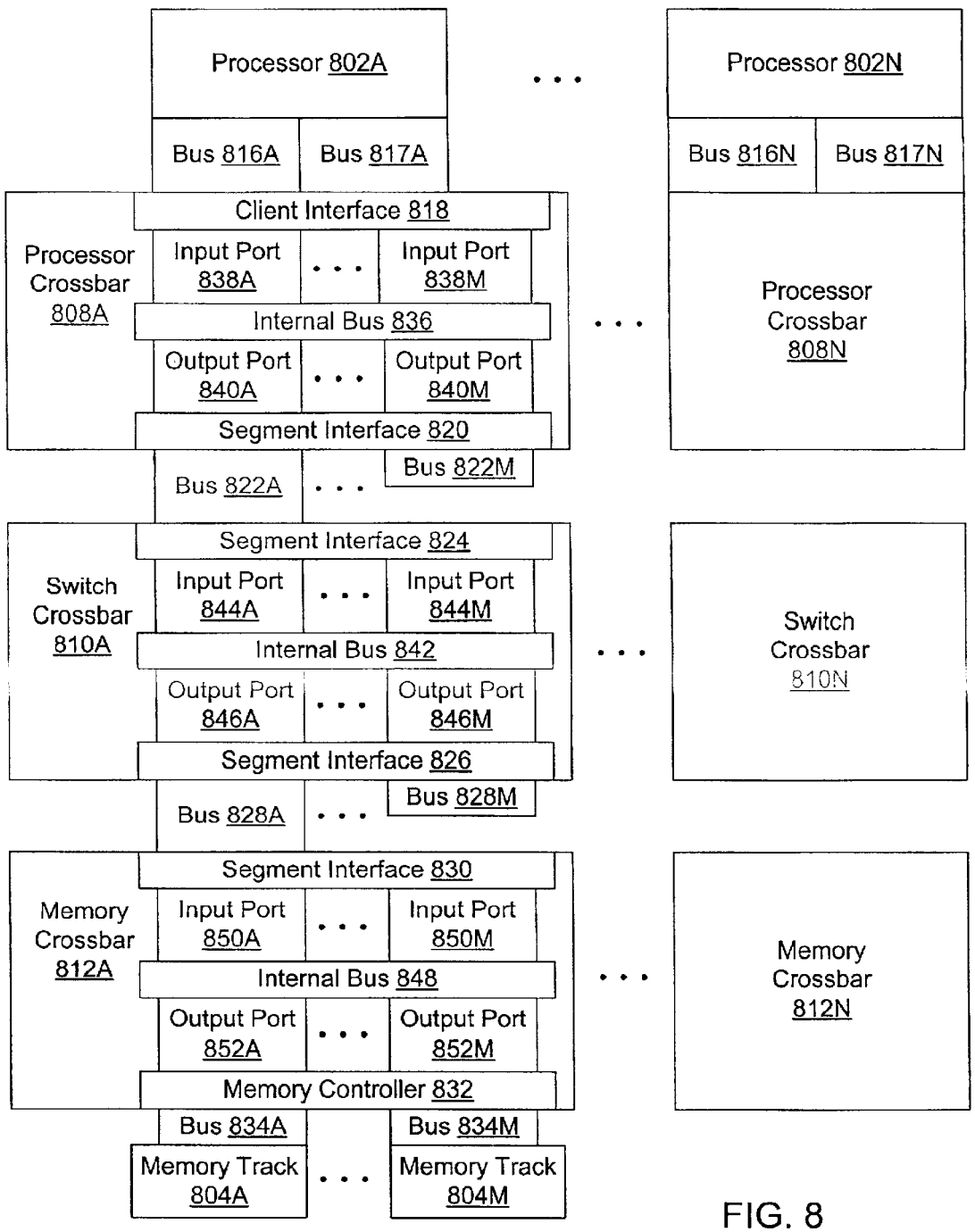
FIG. 8 shows a plurality of processors coupled to a plurality of memory tracks by a switch having three layers according to one implementation: a processor crossbar layer, a switch crossbar layer, and a memory crossbar layer.

Referring to FIG. 8, a plurality of processors 802A through 802N is coupled to a plurality of memory tracks 804A through 804M by a switch having three layers: a processor crossbar layer, a switch crossbar layer, and a memory crossbar layer. The processor crossbar layer includes a plurality of processor crossbars 808A through 808N. The switch crossbar layer includes a plurality of switch crossbars 810A through 810N. The memory crossbar layer includes a plurality of memory crossbars 812A through 812N. In one implementation, N=64. In other implementations, N takes on other values, and can take on different values for each type of crossbar.

Each processor 802 is coupled by a pair of busses 816 and 817 to one of the processor crossbars 808. For example, processor 802A is coupled by busses 816A and 817A to processor crossbar 808A. In a similar manner processor 802N is coupled by busses 816N and 817N to processor crossbar 808N. In one implementation, each of busses 816 and 817 includes many point-to-point connections.

Each processor crossbar 808 includes a plurality of input ports 838A through 838M, each coupled to a bus 816 or 817 by a client interface 818. For example, client interface 818 couples input port 838A in processor crossbar 808A to bus 816A, and couples input port 838M in processor crossbar 808A to bus 817A. In one implementation, M=8. In other implementations, M takes on other values, and can take on different values for each type of port, and can differ from crossbar to crossbar.

Each processor crossbar 808 also includes a plurality of output ports 840A through 840M. Each of the input ports 838 and output ports 840 are coupled to an internal bus 836. In one implementation, each bus 836 includes many point-to-point connections. Each output port 840 is coupled by a segment interface 820 to one of a plurality of busses 822A through 822M. For example, output port 840A is coupled by segment interface 820 to bus 822A. Each bus 822 couples processor crossbar 808A to a different switch crossbar 810. For example, bus 822A couples processor crossbar 808A to switch crossbar 810A. In one implementation, busses 822 include many point-to-point connections.

Each switch crossbar 810 includes a plurality of input ports 844A through 844M, each coupled to a bus 822 by a segment interface 824. For example, input port 844A in switch crossbar 810A is coupled to bus 822A by segment interface 824.

Each switch crossbar 810 also includes a plurality of output ports 846A through 846M. Each of the input ports 844 and output ports 846 are coupled to an internal bus 842. In one implementation, each bus 842 includes many point-to-point connections. Each output port 846 is coupled by a segment interface 826 to one of a plurality of busses 828A through 828M. For example, output port 846A is coupled by segment interface 826 to bus 828A. Each bus 828 couples switch crossbar 810A to a different memory crossbar 812. For example, bus 828A couples switch crossbar 810A to memory crossbar 812A. In one implementation, each of busses 828 includes many point-to-point connections.

Each memory crossbar 812 includes a plurality of input ports 850A through 850M, each coupled to a bus 828 by a segment interface 830. For example, input port 850A in memory crossbar 812A is coupled to bus 828A by segment interface 830.

Each memory crossbar 812 also includes a plurality of output ports 852A through 852M. Each of the input ports 850 and output ports 852 are coupled to an internal bus 848. In one implementation, each bus 848 includes many point-to-point connections. Each output port 852 is coupled by a memory controller 832 to one of a plurality of busses 834A through 834M. For example, output port 852A is coupled by memory controller 832 to bus 834A. Each of busses 834A through 834M couples memory crossbar 812A to a different one of memory tracks 804A through 804M. Each memory track 804 includes one or more synchronous dynamic random access memories (SDRAMs), as discussed below. In one implementation, each of busses 834 includes many point-to-point connections.

In one implementation, each of busses 816, 817, 822, 828, and 834 is a high-speed serial bus where each transaction can include one or more clock cycles. In another implementation, each of busses 816, 817, 822, 828, and 834 is a parallel bus. Conventional flow control techniques can be implemented across each of busses 816, 822, 828, and 834. For example, each of client interface 818, memory controller 832, and segment interfaces 820, 824, 826, and 830 can include buffers and flow control signaling according to conventional techniques.

In one implementation, each crossbar 808, 810, 812 is implemented as a separate semiconductor chip. In one implementation, processor crossbar 808 and processor 802 are implemented together as a single semiconductor chip. In one implementation, each of switch crossbar 810 and memory crossbar 812 is implemented as two or more chips that operate in parallel, as described below.

Processor

Figure 9:
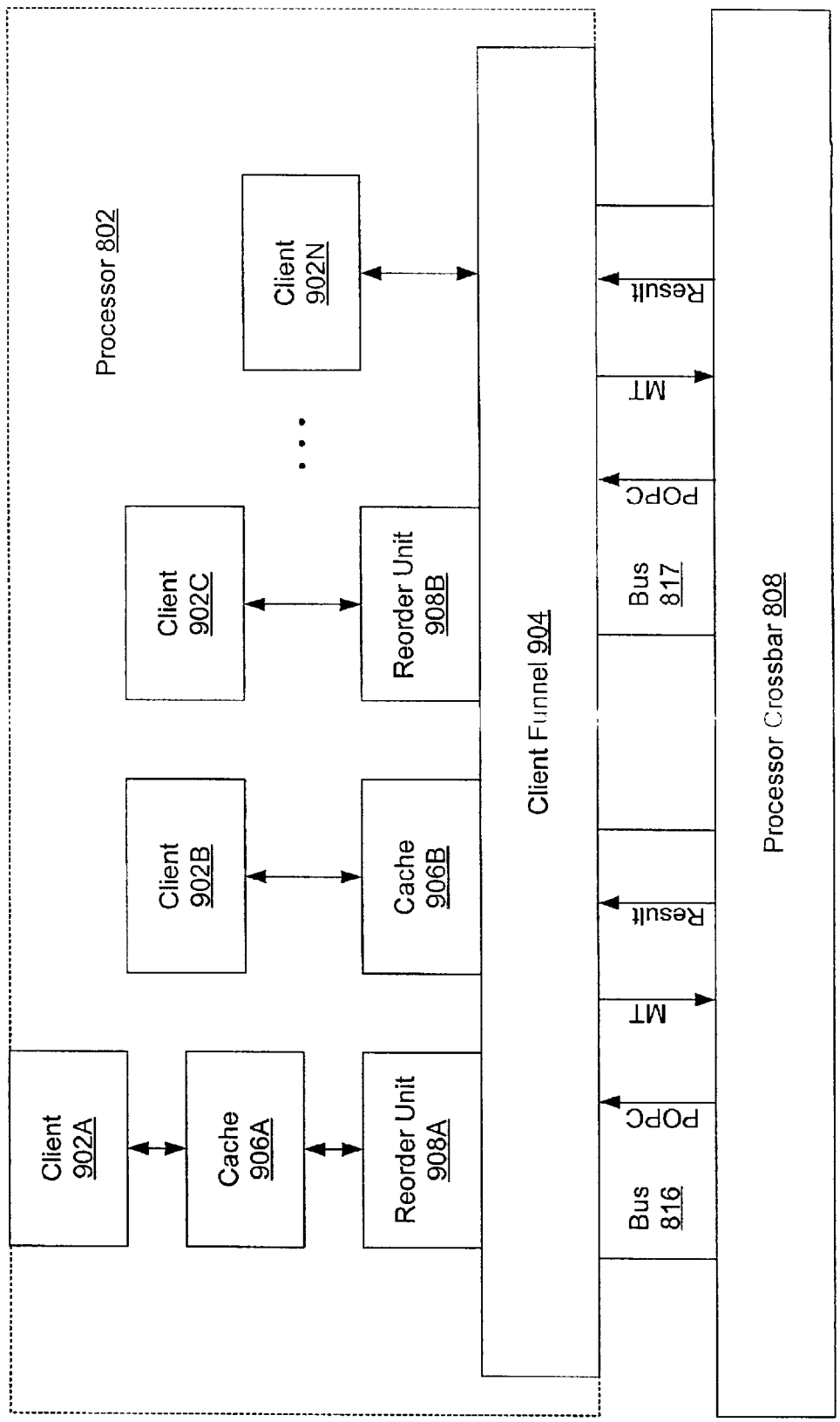
FIG. 9 shows a processor that includes a plurality of clients and a client funnel according to one implementation.

Referring to FIG. 9, in one implementation processor 802 includes a plurality of clients 902 and a client funnel 904. Each client 902 can couple directly to client funnel 904 or through one or both of a cache 906 and a reorder unit 908. For example, client 902A is coupled to cache 906A, which is coupled to reorder unit 908A, which couples to client funnel 904. As another example, client 902B is coupled to cache 906B, which couples to client funnel 904. As another example, client 902C couples to reorder unit 908B, which couples to client funnel 904. As another example, client 902N couples directly to client funnel 904.

Clients 902 manage memory requests from processes executing within processor 802. Clients 902 collect memory transactions (MT) destined for memory. If a memory transaction cannot be satisfied by a cache 906, the memory transaction is sent to memory. Results of memory transactions (Result) may return to client funnel 904 out of order. Reorder unit 908 arranges the results in order before passing them to a client 902.

Each input port 838 within processor crossbar 808 asserts a POPC signal when that input port 838 can accept a memory transaction. In response, client funnel 904 sends a memory transaction to that input port 838 if client funnel 904 has any memory transactions destined for that input port 838.

Processor Crossbar

Figure 10:
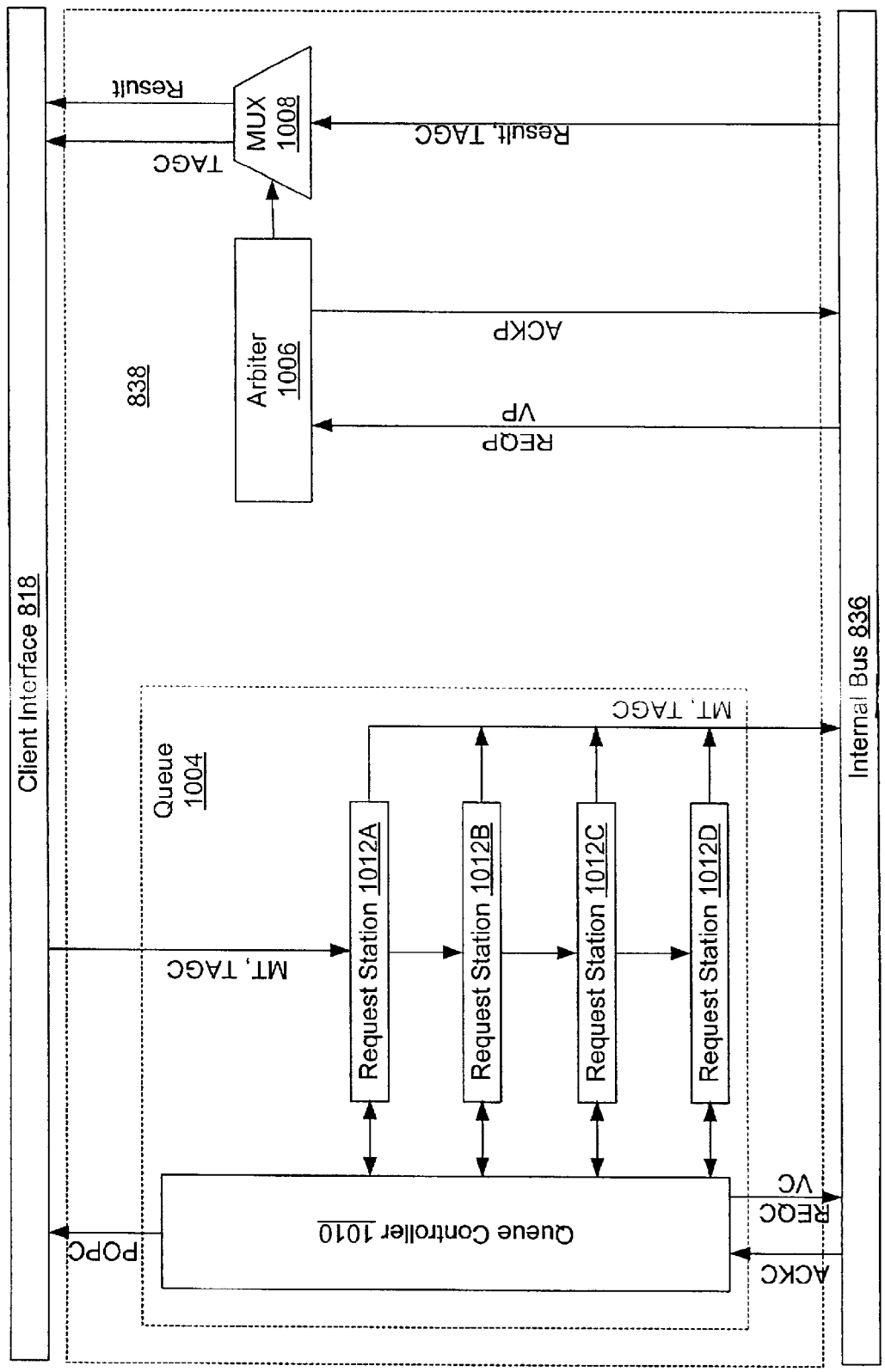
FIG. 10 shows an input port within a processor crossbar according to one implementation.

Referring to FIG. 10, an input port 838 within processor crossbar 808 includes a client interface 818, a queue 1004, an arbiter 1006, and a multiplexer (MUX) 1008. Client interface 818 and arbiter 1006 can be implemented using conventional Boolean logic devices.

Queue 1004 includes a queue controller 1010 and four request stations 1012A, 1012B, 1012C, and 1012D. In one implementation, request stations 1012 are implemented as registers. In another implementation, request stations 1012 are signal nodes separated by delay elements. Queue controller 1010 can be implemented using conventional Boolean logic devices.

Now an example operation of input port 838 in passing a memory transaction from processor 802 to switch crossbar 810 will be described with reference to FIG. 10. For clarity it is assumed that all four of request stations 1012 are valid. A request station 1012 is valid when it currently stores a memory transaction that has not been sent to switch crossbar 810, and a TAGC produced by client funnel 904.

Internal bus 836 includes 64 data busses including 32 forward data busses and 32 reverse data busses. Each request station 1012 in each input port 838 is coupled to a different one of the 32 forward data busses. In this way, the contents of all of the request stations 1012 are presented on internal bus 836 simultaneously.

Each memory transaction includes a command and a memory address. Some memory transactions, such as write transactions, also include data. For each memory transaction, queue controller 1010 asserts a request REQC for one of output ports 840 based on a portion of the address in that memory transaction. Queue controller 1010 also asserts a valid signal VC for each request station 1012 that currently stores a memory transaction ready for transmission to switch crossbar 810.

Each output port 840 chooses zero or one of the request stations 1012 and transmits the memory transaction in that request station to switch crossbar 810, as described below. That output port 840 asserts a signal ACKC that tells the input port 838 which request station 1012 was chosen. If one of the request stations 1012 within input port 838 was chosen, queue controller 1010 receives an ACKC signal. The ACKC signal indicates one of the request stations 1012.

The request stations 1012 within a queue 1004 operate together substantially as a buffer. New memory transactions from processor 802 enter at request station 1012A and progress towards request station 1012D as they age until chosen by an output port. For example, if an output port 840 chooses request station 1012B, then request station 1012B becomes invalid and therefore available for a memory transaction from processor 802. However, rather than placing a new memory transaction in request station 1012B, queue controller 1010 moves the contents of request station 1012A into request station 1012B and places the new memory transaction in request station 1012A. In this way, the identity of a request station serves as an approximate indicator of the age of the memory transaction. In one implementation, only one new memory transaction can arrive during each transaction time, and each memory transaction can age by only one request station during each transaction time. Each transaction time can include one or more clock cycles. In other implementations, age is computed in other ways.

When queue controller 1010 receives an ACKC signal, it takes three actions. Queue controller 1010 moves the contents of the "younger" request stations 1012 forward, as described above, changes the status of any empty request stations 1012 to invalid by disasserting VC, and sends a POPC signal to client interface 818. Client interface segment 818 forwards the POPC signal across bus 816 to client funnel 904, thereby indicating that input port 838 can accept a new memory transaction from client funnel 904.

In response, client funnel 904 sends a new memory transaction to the client interface 818 of that input port 838. Client funnel 904 also sends a tag TAGC that identifies the client 902 within processor 802 that generated the memory transaction.

Queue controller 1010 stores the new memory transaction and the TAGC in request station 1012A, and asserts signals VC and REQC for request station 1012A. Signal VC indicates that request station 1012A now has a memory transaction ready for transmission to switch crossbar 810. Signal REQC indicates through which output port 840 the memory transaction should pass.

Figure 11:
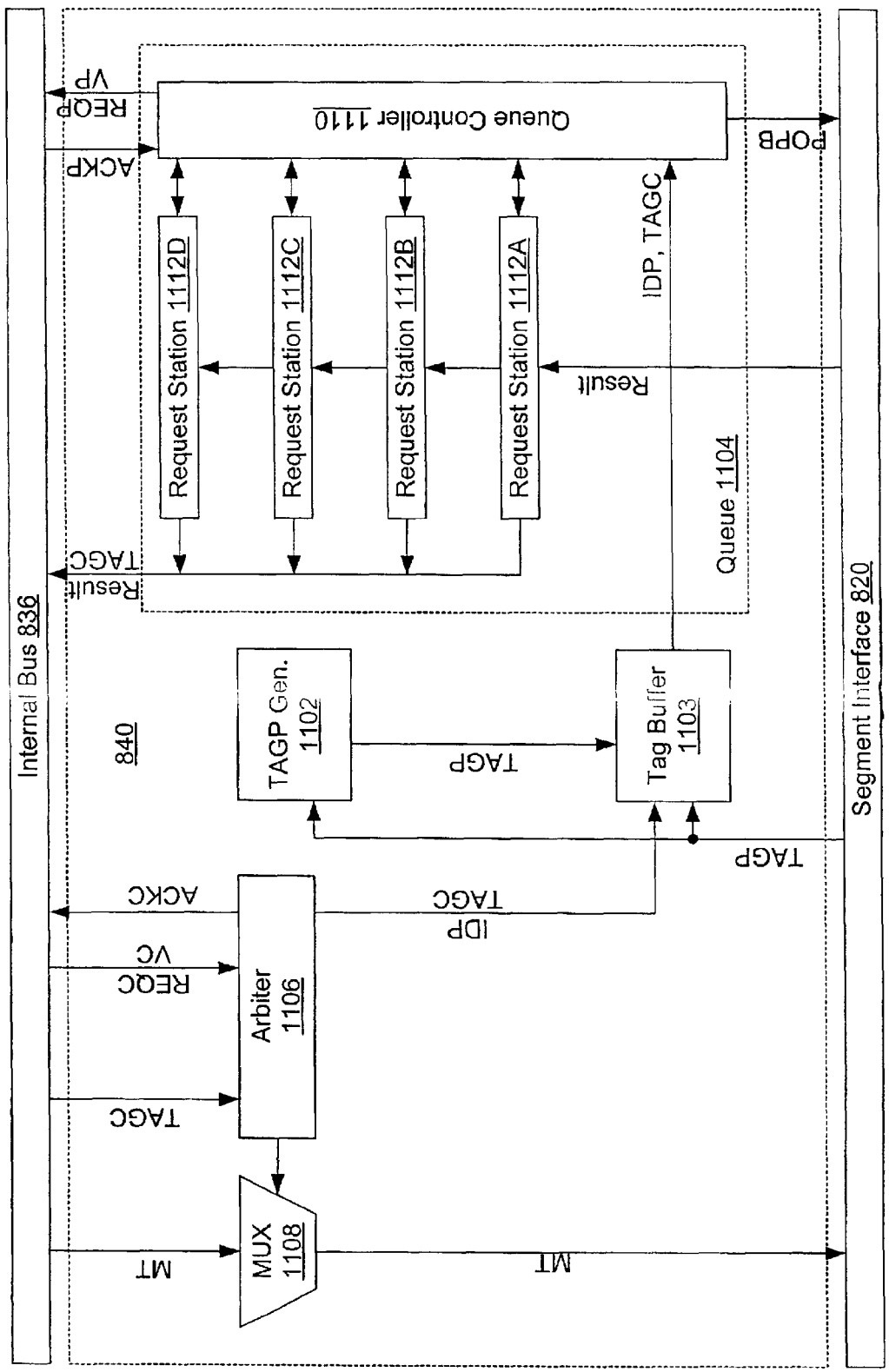
FIG. 11 shows an output port within a processor crossbar according to one implementation.

Referring to FIG. 11, an output port 840 within processor crossbar 808 includes a segment interface 820, a TAGP generator 1102, a tag buffer 1103, a queue 1104, an arbiter 1106, and a multiplexer 1108. Tag generator 1102 can be implemented as described below. Segment interface 820 and arbiter 1106 can be implemented using conventional Boolean logic devices. Tag buffer 1103 can be implemented as a conventional buffer.

Queue 1104 includes a queue controller 1110 and four request stations 1112A, 1112B, 1112C, and 1112D. In one implementation, request stations 1112 are implemented as registers. In another implementation, request stations 1112 are signal nodes separated by delay elements. Queue controller 1110 can be implemented using conventional Boolean logic devices.

Now an example operation of output port 840 in passing a memory transaction from an input port 838 to switch crossbar 810 will be described with reference to FIG. 11. Arbiter 1106 receives a REQC signal and a VC signal indicating that a particular request station 1012 within an input port 838 has a memory transaction ready for transmission to switch crossbar 810. The REQC signal identifies the request station 1012, and therefore, the approximate age of the memory transaction within that request station 1012. The VC signal indicates that the memory transaction within that request station 1012 is valid. In general, arbiter 1106 receives such signals from multiple request stations 1012 and chooses the oldest request station t 012 for transmission.

Arbiter 1106 causes multiplexer 1108 to gate the memory transaction (MT) within the chosen request station 1012 to segment interface 820. Arbiter 1106 generates a signal IDP that identifies the input port 838 within which the chosen request station 1012 resides. The identity of that input port 838 is derived from the REQC signal.

Tag generator 1102 generates a tag TAGP according to the methods described below. Arbiter 1106 receives the TAGC associated with the memory transaction. The IDP, TAGC, and TAGP are stored in tag buffer 1103. In one implementation, any address information within the memory transaction that is no longer needed (that is, the address information that routed the memory transaction to output port 840) is discarded. In another implementation that address information is passed with the memory transaction to switch crossbar 810. Arbiter 1106 asserts an ACKC signal that tells the input port 838 containing the chosen request station 1012 that the memory transaction in that request station has been transmitted to switch crossbar 810.

Now an example operation of output port 840 in passing a result of a memory transaction from switch crossbar 810 to processor 802 will be described with reference to FIG. 11. For clarity it is assumed that all four of request stations 1112 are valid. A request station 1112 is valid when it currently stores a memory transaction that has not been sent to processor 802, and a TAGC and IDP retrieved from tag buffer 1103.

As mentioned above, internal bus 836 includes 32 reverse data busses. Each request station 1112 in each output port 840 is coupled to a different one of the 32 reverse data busses. In this way, the contents of all of the request stations 1112 are presented on internal bus 836 simultaneously.

Some results, such as a result of a read transaction, include data. Other results, such as a result for a write transaction, include an acknowledgement but no data. For each result, queue controller 1110 asserts a request REQP for one of input ports 838 based on IDP. As mentioned above, IDP indicates the input port 838 from which the memory transaction prompting the result originated. Queue controller 1110 also asserts a valid signal VP for each request station 1112 that currently stores a result ready for transmission to processor 802.

Each input port 838 chooses zero or one of the request stations 1112 and transmits the result in that request station to processor 802, as described below. That input port 838 asserts a signal ACKP that tells the output port 840 which request station 1112 within that output port was chosen. If one of the request stations 1112 within output port 840 was chosen, queue controller 1110 receives an ACKP signal. The ACKP signal indicates one of the request stations 1112.

The request stations 1112 within a queue 1104 operate together substantially as a buffer. New results from processor 802 enter at request station 1112A and progress towards request station 1112D until chosen by an input port 838. For example, if an input port 838 chooses request station 1112B, then request station 1112B becomes invalid and therefore available for a new result from switch crossbar 810. However, rather than placing a new result in request station 1112B, queue controller 1110 moves the contents of request station 1112A into request station 1112B and places the new result in request station 1112A. In this way, the identity of a request station 1112 serves as an approximate indicator of the age of the result. In one implementation, only one new memory transaction can arrive during each transaction time, and each memory transaction can age by only one request station during each transaction time. In other implementations, age is computed in other ways.

When queue controller 1110 receives an ACKP signal, it takes three actions. Queue controller 1110 moves the contents of the "younger" request stations forward, as described above, changes the status of any empty request stations to invalid by disasserting VP, and sends a POPB signal to segment interface 820, segment interface 820 forwards the POPB signal across bus 822 to switch crossbar 810, thereby indicating that output port 840 can accept a new result from switch crossbar 810.

In response, switch crossbar 810 sends a new result, and a TAGP associated with that result, to the segment interface 820 of that output port 840. The generation of TAGP, and association of that TAGP with the result, are discussed below with reference to FIG. 12.

Tag buffer 1103 uses the received TAGP to retrieve the IDP and TAGC associated with that TAGP. TAGP is also returned to TAGP generator 1102 for use in subsequent transmissions across bus 822.

Queue controller 1110 stores the new result the TAGP, and the IDP in request station 1112A, and asserts signals VP and REQP for request station 1112A. Signal VP indicates that request station 1112A now has a result ready for transmission to processor 802. Signal REQP indicates through which input port 838 the result should pass.

Now an example operation of input port 838 in passing a result from an output port 840 to processor 802 will be described with reference to FIG. 10. Arbiter 1006 receives a REQP signal and a VP signal indicating that a particular request station 1112 within an output port 840 has a result ready for transmission to processor 802. The REQP signal identifies the request station 1112, and therefore, the approximate age of the result within that request station 1112. The VP signal indicates that the memory transaction within that request station 1112 is valid. In general, arbiter 1006 receives such signals from multiple request stations 1112 and chooses the oldest request station 1112 for transmission.

Arbiter 1006 causes multiplexer 1008 to gate the result and associated TAGC to client interface 818. Arbiter 1006 also asserts an ACKP signal that tells the output port 840 containing the chosen request station 1112 that the result in that request station has been transmitted to processor 802.

Switch Crossbar

Figure 12:
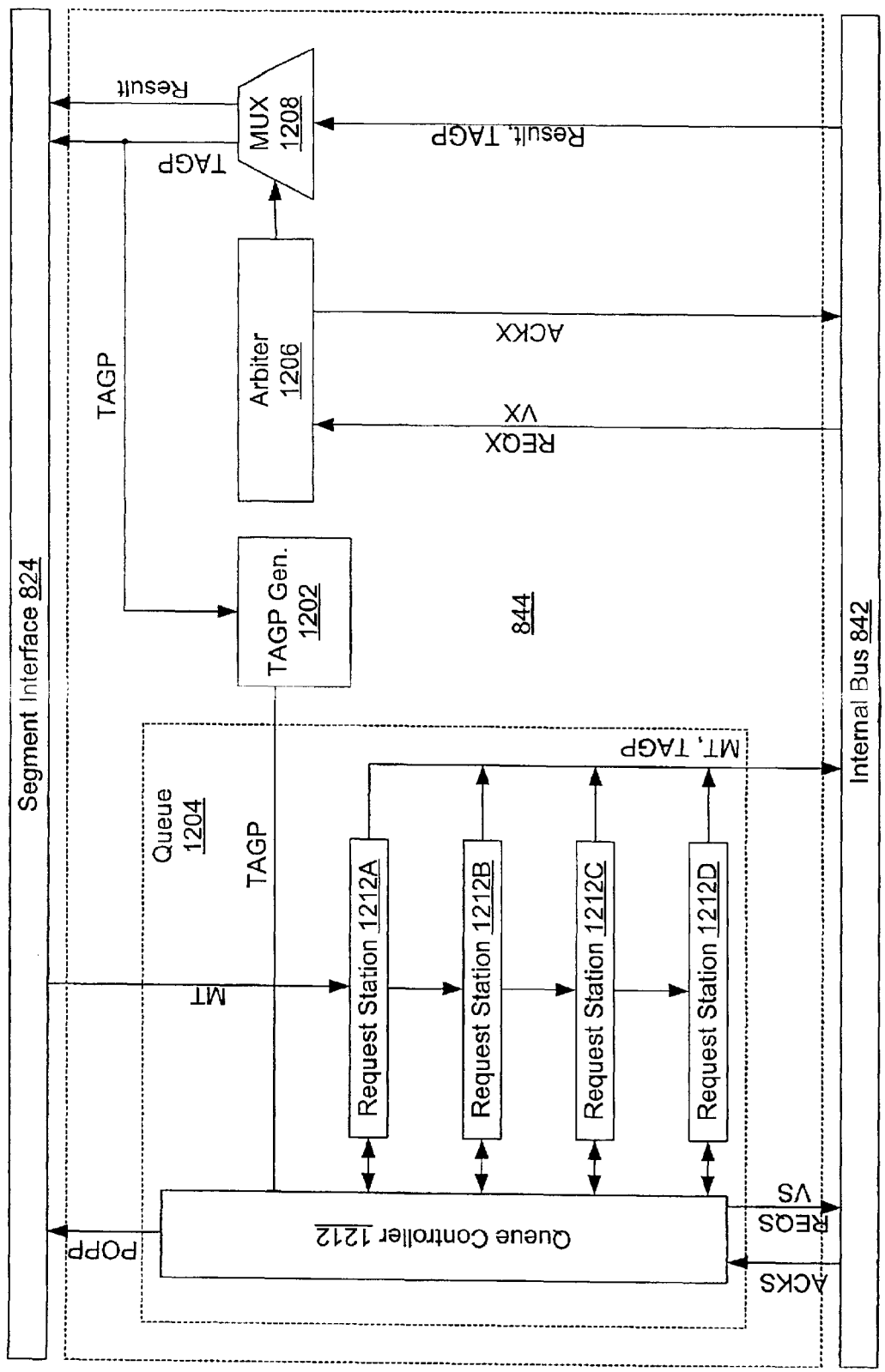
FIG. 12 shows an input port within a switch crossbar according to one implementation.

Referring to FIG. 12, an input port 844 within switch crossbar 810 includes a segment interface 824, a TAGP generator 1202, a queue 1204, an arbiter 1206, and a multiplexer 1208. TAGP generator 1202 can be implemented as described below. Segment interface 824 and arbiter 1206 can be implemented using conventional Boolean logic devices.

Queue 1204 includes a queue controller 1210 and four request stations 1212A, 1212B, 1212C, and 1212D. In one implementation, request stations 1212 are implemented as registers. In another implementation, request stations 1212 are signal nodes separated by delay elements. Queue controller 1210 can be implemented using conventional Boolean logic devices.

Now an example operation of input port 844 in passing a memory transaction from processor crossbar 808 to memory crossbar 812 will be described with reference to FIG. 12. For clarity it is assumed that all four of request stations 1212 are valid. A request station 1212 is valid when it currently stores a memory transaction that has not been sent to memory crossbar 812, and a TAGP produced by TAGP generator 1202.

Internal bus 842 includes 64 data busses including 32 forward data busses and 32 reverse data busses. Each request station 1212 in each input port 844 is coupled to a different one of the 32 forward data busses. In this way, the contents of all of the request stations 1212 are presented on internal bus 842 simultaneously.

Each memory transaction includes a command and a memory address. Some memory transactions such as rite transactions, also include data For each memory transaction queue controller 1210 asserts a request REQS for one of output ports 846 based on a portion of the address in that memory transaction. Queue controller 1210 also asserts a valid signal VS for each request station 1212 that currently stores a memory transaction ready for transmission to memory crossbar 812.

Each output port 846 chooses zero or one of the request stations 1212 and transmits the memory transaction in that request station to memory crossbar 812, as described below. That output port 846 asserts a signal ACKS that tells the input port 844 which request station 1212 was chosen. If one of the request stations 1212 within input port 844 was chosen, queue controller 1210 receives an ACKS signal. The ACKS signal indicates one of the request stations 1212.

The request stations 1212 within a queue 1204 operate together substantially as a buffer. New memory transactions from processor crossbar 808 enter at request station 1212A and progress towards request station 1212D as they age until chosen by an output port. For example, if an output port 846 chooses request station 1212B, then request station 1212B becomes invalid and therefore available for a memory transaction from processor crossbar 808. However, rather than placing a new memory transaction in request station 1212B, queue controller 1210 moves the contents of request station 1212A into request station 1212B and places the new memory transaction in request station 1212A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

When queue controller 1210 receives an ACKS signal, it takes three actions. Queue controller 1210 moves the contents of the "younger" request stations 1212 forward, as described above, changes the status of any empty request stations 1212 to invalid by disasserting VS, and sends a POPP signal to segment interface 824. Segment interface 824 forwards the POPP signal across bus 822 to processor crossbar 808, thereby indicating that input port 844 can accept a new memory transaction from processor crossbar 808.

In response, processor crossbar 808 sends a new memory transaction to the segment interface 824 of that input port 844. TAGP generator 1202 generates a TAGP for the memory transaction. Tag generators 1202 and 1102 are configured to independently generate the same tags in the same order, and are initialized to generate the same tags at substantially the same time, as discussed below. Therefore, the TAGP generated by TAGP generator 1202 for a memory transaction has the same value as the TAGP generated for that memory transaction by TAGP generator 1102. Thus the tagging technique of this implementation allows a result returned from memory tracks 804 to be matched at processor 802 with the memory transaction that produced that result.

Queue controller 1210 stores the new memory transaction and the TAGP in request station 1212A, and asserts signals VS and REQS for request station 1212A. Signal VS indicates that request station 1212A now has a memory transaction ready for transmission to memory crossbar 812. Signal REQS indicates through which output port 846 the memory transaction should pass.

Figure 13:
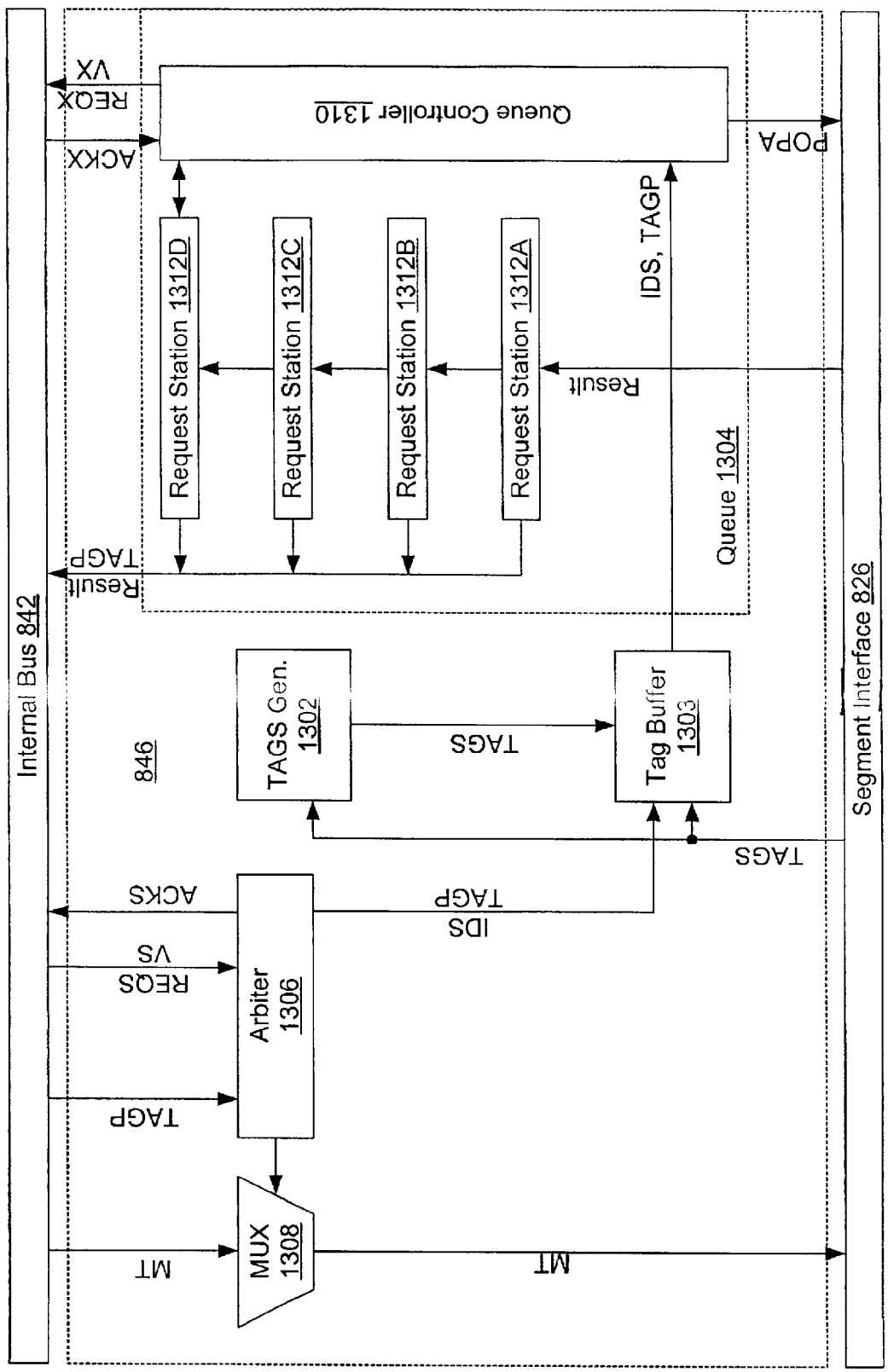
FIG. 13 shows an output port within a switch crossbar according to one implementation.

Referring to FIG. 13, an output port 846 within switch crossbar 810 includes a segment interface 826, a TAGS generator 1302, a tag buffer 1303, a queue 1304, an arbiter 1306, and a multiplexer 1308. TAGS generator 1302 can be implemented as described below. Segment interface 826 and arbiter 1306 can be implemented using conventional Boolean logic devices. Tag buffer 1303 can be implemented as a conventional buffer.

Queue 1304 includes a queue controller 1310 and four request stations 1312A, 1312B, 1312C, and 1312D. In one implementation, request stations 1312 are implemented as registers. In another implementation, request stations 1312 are signal nodes separated by delay elements. Queue controller 1310 can be implemented using conventional Boolean logic devices.

Now an example operation of output port 846 in passing a memory transaction from an input port 844 to memory crossbar 812 will be described with reference to FIG. 13. Arbiter 1306 receives a REQS signal and a VS signal indicating that a particular request station 1212 within an input port 844 has a memory transaction ready for transmission to memory crossbar 812. The REQS signal identifies the request station 1212, and therefore, the approximate age of the memory transaction within that request station 1212. The VS signal indicates that the memory transaction within that request station 1212 is valid. In general, arbiter 1306 receives such signals from multiple request stations 1212 and chooses the oldest request station 1212 for transmission.

Arbiter 1306 causes multiplexer 1308 to gate the memory transaction (MT) within the chosen request station 1212 to segment interface 826. Arbiter 1306 generates a signal IDS that identifies the input port 844 within which the chosen request station 1212 resides. The identity of that input port 844 is derived from the REQC signal.

TAGS generator 1302 generates a tag TAGS according to the methods described below. Arbiter 1306 receives the TAGP associated with the memory transaction. The IDS, TAGP, and TAGS are stored in tag buffer 1303. In one implementation, any address information within the memory transaction that is no longer needed (that is, the address information that routed the memory transaction to output port 846) is discarded. In another implementation that address information is passed with the memory transaction to memory crossbar 812. Arbiter 1306 asserts an ACKS signal that tells the input port 844 containing the chosen request station 1212 that the memory transaction in that request station has been transmitted to memory crossbar 812.

Now an example operation of output port 846 in passing a result of a memory transaction from memory crossbar 812 to processor crossbar 808 will be described with reference to FIG. 13. For clarity it is assumed that all four of request stations 1312 are valid. A request station 1312 is valid when it currently stores a memory transaction that has not been sent to processor crossbar 808, and a TAGP and IDS retrieved from tag buffer 1303.

As mentioned above, internal bus 842 includes 32 reverse data busses. Each request station 1312 in each output port 846 is coupled to a different one of the 32 reverse data busses. In this way, the contents of all of the request stations 1312 are presented on internal bus 842 simultaneously.

Some results, such as a result of a read transaction, include data. Other results, such as a result for a write transaction, include an acknowledgement but no data. For each result, queue controller 1310 asserts a request REQX for one of input ports 844 based on IDS. As mentioned above, IDS indicates the input port 844 from which the memory transaction prompting the result originated. Queue controller 1310 also asserts a valid signal VX for each request station 1312 that currently stores a result ready for transmission to processor crossbar 808.

Each input port 844 chooses zero or one of the request stations 1312 and transmits the result in that request station to processor crossbar 808, as described below. That input port 844 asserts a signal ACKX that tells the output port 846 which request station 1312 within that output port was chosen. If one of the request stations 1312 within output port 846 was chosen, queue controller 1310 receives an ACKX signal. The ACKX signal indicates one of the request stations 1312.

The request stations 1312 within a queue 1304 operate together substantially as a buffer. New results from processor crossbar 808 enter at request station 1312A and progress towards request station 1312D until chosen by an input port 844. For example, if an input port 844 chooses request station 1312B, then request station 1312B becomes invalid and therefore available for a new result from memory crossbar 812. However, rather than placing a new result in request station 1312B, queue controller 1310 moves the contents of request station 1312A into request station 1312B and places the new result in request station 1312A. In this way, the identity of a request station 1312 serves as an approximate indicator of the age of the result. In one implementation, only one new memory transaction can arrive during each transaction time, and each memory transaction can age by only one request station during each transaction time. In other implementations, age is computed in other ways.

When queue controller 1310 receives an ACKX signal, it takes three actions. Queue controller 1310 moves the contents of the "younger" request stations forward, as described above, changes the status of any empty request stations to invalid, and sends a POPA signal to segment interface 826. Segment interface 826 forwards the POPA signal across bus 822 to memory crossbar 812, thereby indicating that output port 846 can accept a new result from memory crossbar 812.

In response, memory crossbar 812 sends a new result, and a TAGS associated with that result, to the segment interface 826 of that output port 846. The generation of TAGS, and association of that TAGS with the result, are discussed below with reference to FIG. 14

Tag buffer 1303 uses the received TAGS to retrieve the IDS and TAGP associated with that TAGS. TAGS is also returned to TAGS generator 1302 for use in subsequent transmissions across bus 828.

Queue controller 1310 stores the new result, the TAGP, and the IDS in request station 1312A, and asserts signals VX and REQX for request station 1312A. Signal VX indicates that request station 1312A now has a result ready for transmission to processor crossbar 808. Signal REQX indicates through which input port 844 the result should pass.

Now an example operation of input port 844 in passing a result from an output port 846 to processor crossbar 808 will be described with reference to FIG. 12. Arbiter 1206 receives a REQX signal and a VX signal indicating that a particular request station 1312 within an output port 846 has a result ready for transmission to processor crossbar 808. The REQX signal identifies the request station 1312, and therefore, the approximate age of the result within that request station 1312. The VX signal indicates that the memory transaction within that request station 1312 is valid. In general, arbiter 1206 receives such signals from multiple request stations 1312 and chooses the oldest request station 1312 for transmission.

Arbiter 1206 causes multiplexer 1208 to gate the result and associated TAGP to segment interface 824, and to return the TAGP to TAGP generator 1202 for use with future transmissions across bus 822. Arbiter 1206 also asserts an ACKX signal that tells the output port 846 containing the chosen request station 1312 that the result in that request station has been transmitted to processor crossbar 808.

Memory Crossbar

Figure 14:
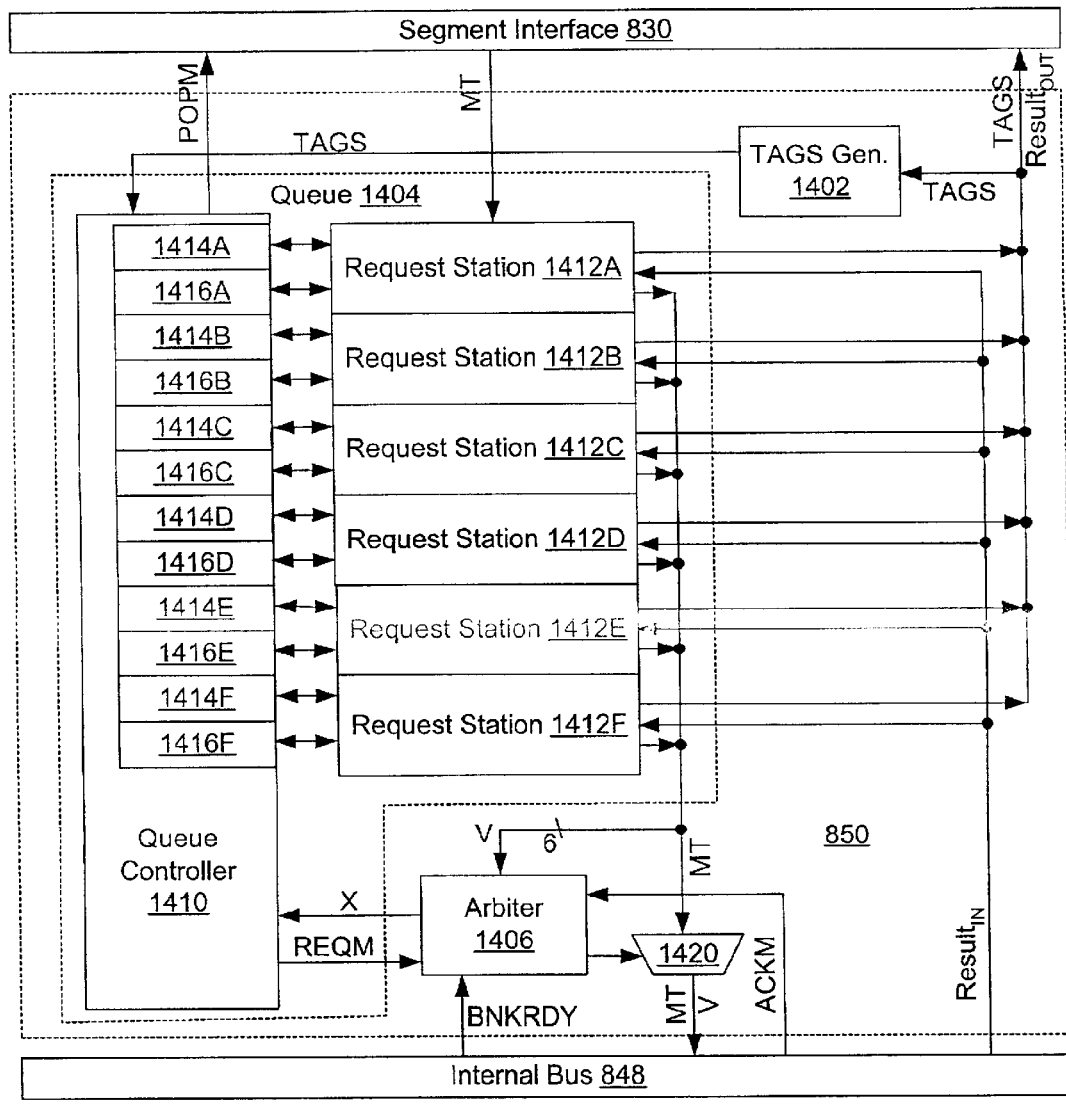
FIG. 14 shows an input port within a memory crossbar according to one implementation.

Referring to FIG. 14, an input port 850 within memory crossbar 812 is connected to a segment interface 830 and an internal bus 848, and includes a TAGS generator 1402, a queue 1404, an arbiter 1406, and multiplexer (MUX) 1420. TAGS generator 1402 can be implemented as described below. Segment interface 830 and arbiter 1406 can be implemented using conventional Boolean logic devices. Queue 1404 includes a queue controller 1410 and six request stations 1412A, 1412B, 1412C, 1412D, 1412E, and 1412F. Queue controller 1410 includes a forward controller 1414 and a reverse controller 1416 for each request station 1412. Forward controllers 1414 include forward controllers 1414A, 1414B, 1414C, 1414D, 1414E, and 1414F. Reverse controllers 1416 include forward controllers 1416A, 1416B, 1416C, 1416D, 1416E, and 1416F. Queue controller 1410, forward controllers 1414 and reverse controllers 1416 can be implemented using conventional Boolean logic devices.

Now an example operation of input port 850 in passing a memory transaction from switch crossbar 810 to a memory track 804 will be described with reference to FIG. 14. For clarity it is assumed that all six of request stations 1412 are valid. A request station 1412 is valid when it currently stores a memory transaction that has not been sent to a memory track 804, and a TAGS produced by TAGS generator 1402.

The request stations 1412 within a queue 1404 operate together substantially as a buffer. New memory transactions from switch crossbar 810 enter at request station 1412A and progress towards request station 1412 F until chosen by an output port 852. For example, if an output port 852 chooses request station 1412B, then request station 1412B becomes invalid and therefore available for a memory transaction from switch crossbar 810. However, rather than placing a new memory transaction in request station 1412B, queue controller 1410 moves the contents of request station 1412A into request station 1412B and places the new memory transaction in request station 1412A. In this way, the identity of a request station serves as an approximate indicator of the age of the memory transaction. In one implementation, only one new memory transaction can arrive during each transaction time, and each memory transaction can age by only one request station during each transaction time. In other implementations, age is computed in other ways.

For each memory transaction, queue controller 1410 asserts a request REQM for one of output ports 852 based on a portion of the address in that memory transaction. Queue controller 1410 also asserts a valid signal V for each request station that currently stores a memory transaction ready for transmission to memory tracks 804.

Internal bus 842 includes 64 separate two-way private busses. Each private bus couples one input port 850 to one output port 852 so that each input port has a private bus with each output port.

Each arbiter 1406 includes eight pre-arbiters (one for each private bus). Each multiplexer 1420 includes eight pre-multiplexers (one for each private bus). Each pre-arbiter causes a pre-multiplexer to gate zero or one of the request stations 1412 to the private bus connected to that pre-multiplexer. In this way, an input port 850 can present up to six memory transactions on internal bus 848 simultaneously.

A pre-arbiter selects one of the request stations based on several criteria. The memory transaction must be valid. This information is given by the V signal. The memory transaction in the request station must be destined to the output port 852 served by the pre-arbiter. This information is given by the REQM signal. The memory bank addressed by the memory transaction must be ready to accept a memory transaction. The status of each memory bank is given by a BNKRDY signal generated by output ports 852, as described below. The pre-arbiter considers the age of each memory transaction as well. This information is given by the identity of the request station 1412.

Each output port 852 sees eight private data busses, each presenting zero or one memory transactions from an input port 850. Each output port 852 chooses zero or one of the memory transactions and transmits that memory transaction to memory controller 832, as described below. That output port 852 asserts a signal ACKM that tells the input port 850 which bus, and therefore which input port 850, was chosen. If one of the request stations 1412 within input port 850 was chosen, the pre-arbiter for that bus receives an ACKM signal. The ACKM signal tells the pre-arbiter that the memory transaction presented on the bus served by that pre-arbiter was transmitted to memory. The pre-arbiter remembers which request station 1412 stored that memory transaction, and sends a signal X to queue controller 1410 identifying that request station 1412.

Queue controller 1410 takes several actions when it receives a signal X. Queue controller 1410 moves the contents of the "younger" request stations forward, as described above, changes the status of any empty request stations to invalid by disasserting V, and moves the TAGS for the memory transaction just sent into a delay unit 1408.

Queue controller 1410 also sends a POPM signal to segment interface 830. Segment interface 830 forwards the POPM signal across bus 828 to switch crossbar 810, thereby indicating that input port 850 can accept a new memory transaction from switch crossbar 810.

In response, switch crossbar 810 sends a new memory transaction to the segment interface 830 of that input port 850. TAGS generator 1402 generates a TAGS for the memory transaction. TAGS generators 1402 and 1302 are configured to independently generate the same tags in the same order, and are initialized to generate the same tags at substantially the same time, as discussed below. Therefore, the TAGS generated by TAGS generator 1402 for a memory transaction has the same value as the TAGS generated for that memory transaction by TAGS generator 1302. Thus the tagging technique of this implementation allows a result returned from memory tracks 804 to be returned to the process that originated the memory transaction that produced that result.

Queue controller 1410 stores the new memory transaction and the TAGS in request station 1412A, and asserts signals V and REQM. Signal V indicates that request station 1412A now has a memory transaction ready for transmission to memory tracks 804. Signal REQM indicates through which input port 844 the result should pass.

Figure 15:
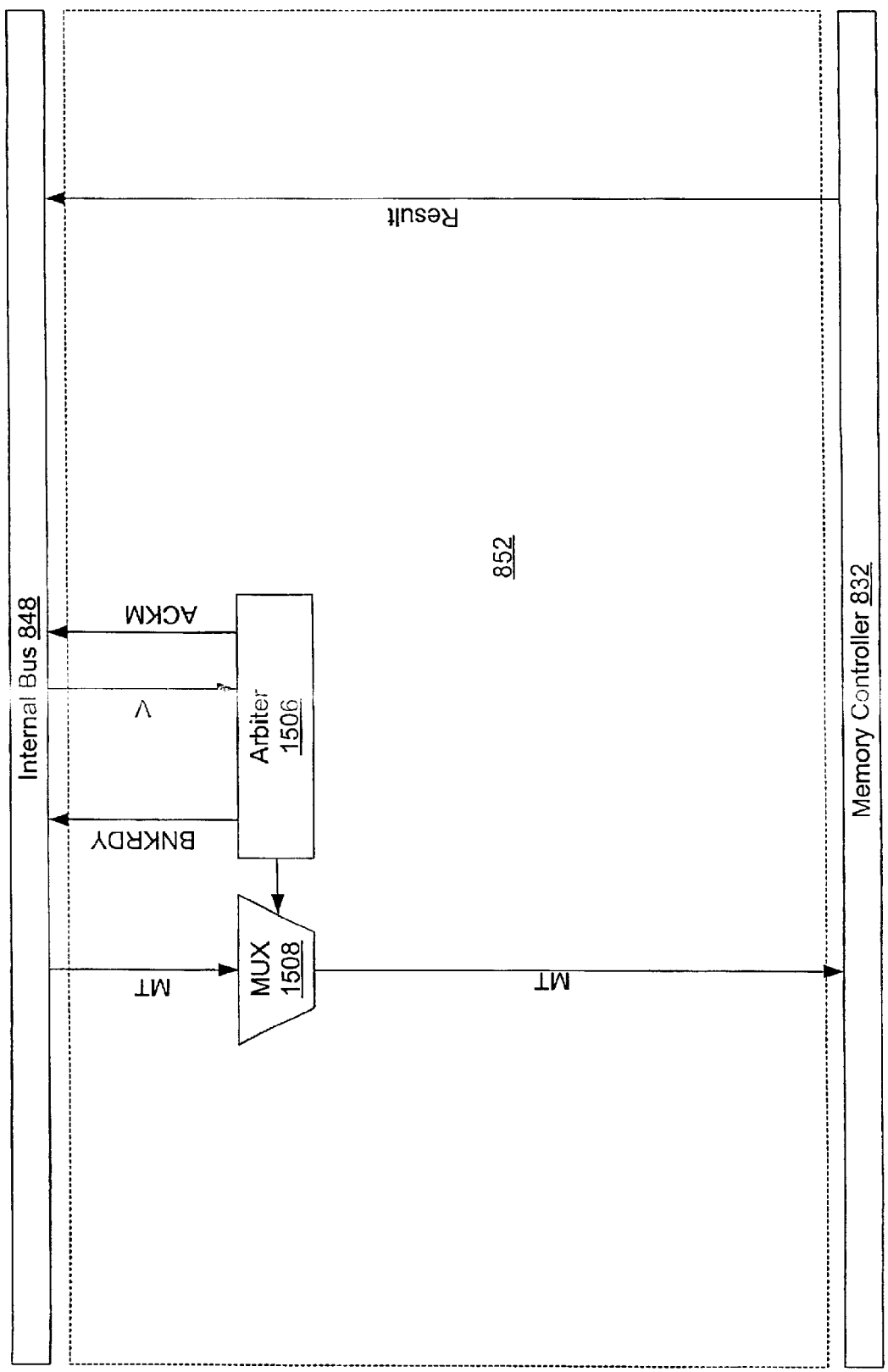
FIG. 15 shows an output port within a memory crossbar according to one implementation.

Referring to FIG. 15, an output port 852 within memory crossbar 812 includes a memory controller 832, an arbiter 1506, and a multiplexer 1508. Memory controller 832 and arbiter 1506 can be implemented using conventional Boolean logic devices.

Now an example operation of output port 852 in passing a memory transaction from an input port 850 to a memory track 804 will be described with reference to FIG. 15. Arbiter 1506 receives one or more signals V each indicating that a request station 1412 within an input port 850 has presented a memory transaction on its private bus with that output port 852 for transmission to memory tracks 804. The V signal indicates that the memory transaction within that request station 1412 is valid. In one implementation, arbiter 1506 receives such signals from multiple input ports 850 and chooses one of the input ports 850 based on a fairness scheme.

Arbiter 1506 causes multiplexer 1508 to gate any data within the chosen request station to memory controller 832. Arbiter 1506 also gates the command and address within the request station to memory controller 832. Arbiter 1506 asserts an ACKM signal that tells the input port 850 containing the chosen request station 1412 that the memory transaction in that request station has been transmitted to memory tracks 804.

Now an example operation of output port 852 in passing a result of a memory transaction from memory tracks 804 to switch crossbar 810 will be described with reference to FIG. 15. When a result arrives at memory controller 832, memory controller 832 sends the result (Result$_{IN}$) over internal bus 848 to the input port 850 that transmitted the memory transaction that produced that result. Some results, such as a result of a read transaction, include data. Other results, such as a result for a write transaction, include an acknowledgement but no data.

Now an example operation of input port 850 in passing a result from an output port 852 to switch crossbar 810 will be described with reference to FIG. 14. Each result received over internal bus 848 is placed in the request station from which the corresponding memory transaction was sent. Each result and corresponding TAGS progress through queue 1404 towards request station 1412 F until selected for transmission to switch crossbar 810.

Figure 16:
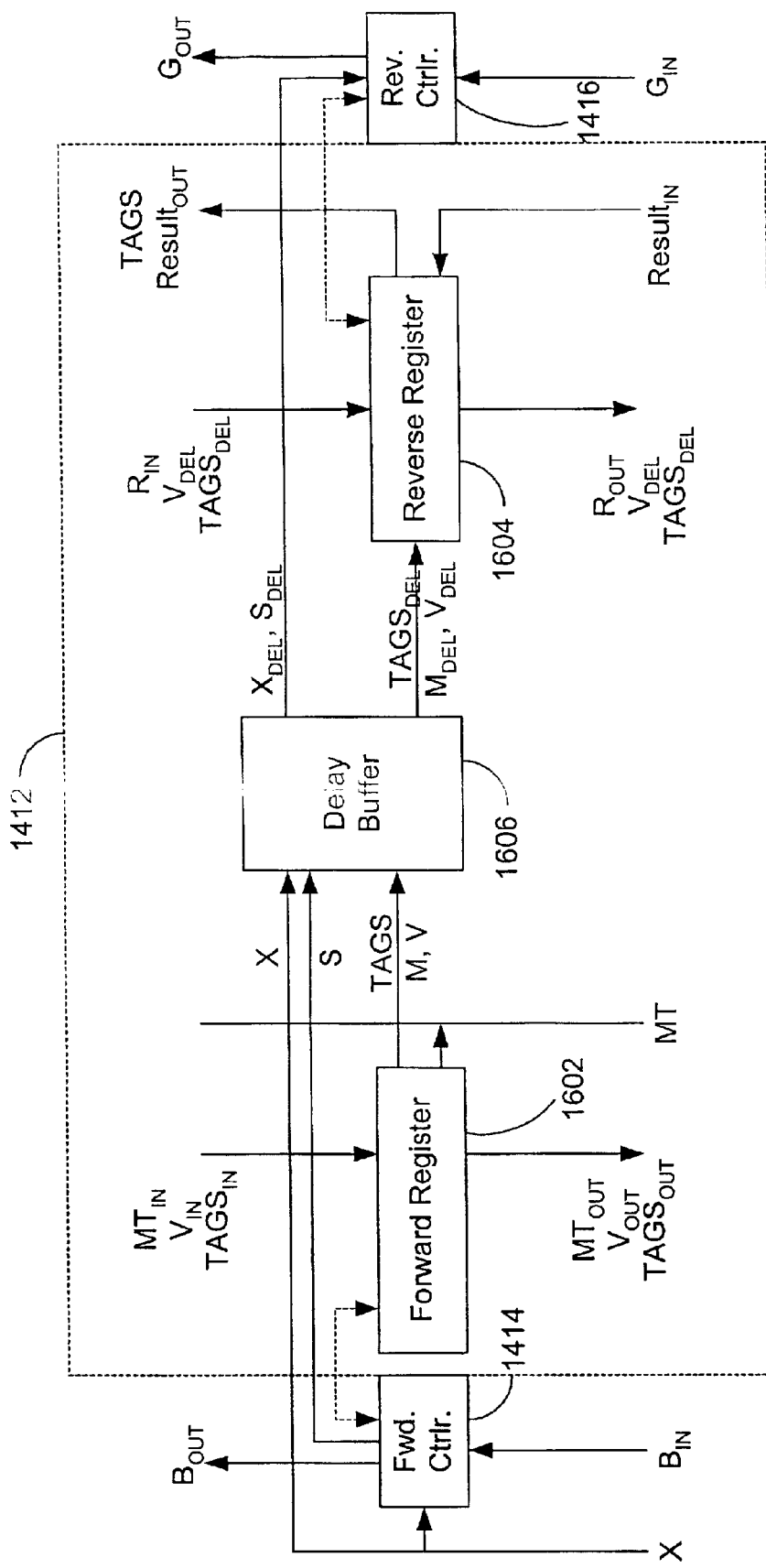
FIG. 16 depicts a request station according to one implementation.

FIG. 16 depicts a request station 1412 according to one implementation. Request station 1412 includes a forward register 1602, a reverse register 1604, and a delay buffer 1606. Forward register 1602 is controlled by a forward controller 1414. Reverse register 1604 is controlled by a reverse controller 1416.

Queue 1404 operates according to transaction cycles. A transaction cycle includes a predetermined number of clock cycles. Each transaction cycle queue 1404 may receive a new memory transaction (MT) from a switch crossbar 810. As described above, new memory transactions (MT) are received in request station 1412A, and age through queue 1404 each transaction cycle until selected by a signal X. Request station 1412A is referred to herein as the "youngest" request station, and includes the youngest forward and reverse controllers, the youngest forward and reverse registers, and the youngest delay buffer. Similarly, request station 1412 F is referred to herein as the "oldest" request station, and includes the oldest forward and reverse controllers, the oldest forward and reverse registers, and the oldest delay buffer.

The youngest forward register receives new memory transactions (MT$_{IN}$) from switch crossbar 810. When a new memory transaction MT$_{IN}$ arrives in the youngest forward register, the youngest forward controller sets the validity bit V$_{IN}$ for the youngest forward register and places a tag TAGS from tag generator 1402 into the youngest forward register. In this description a bit is set by making it a logical one ("1") and cleared by making it a logical zero ("0").

When set, signal X indicates that the contents of forward register 1602 have been transmitted to a memory track 804.

Each forward controller 1414 generates a signal B$_{OUT}$ every transaction cycle where $$B_{OUT} = VB_{IN}\overline{X} \quad (1)$$

where B$_{OUT}$ is used by a younger forward register as B$_{IN}$ and B$_{IN}$=0 for the oldest forward register.

Each forward controller 1414 shifts into its forward register 1602 the contents of an immediately younger forward register when:

$$S=1 \quad (2)$$

where $$S = \overline{V} + X + \overline{B_{IN}} \quad (3)$$

where V indicates that the contents of the forward register 1602 are valid and X indicates that the memory transaction in that forward register 1602 has been placed on internal bus 848 by arbiter 1406. Note that X is only asserted for a forward register 1602 when that forward register is valid (that is, when the validity bit V is set for that forward register). The contents of each forward register include a memory transaction MT, a validity bit V, and a tag TAGS.

Referring to FIG. 16, the contents being shifted into forward register 1602 from an immediately younger forward register are denoted $MT_{IN}$, $V_{IN}$, and $TAGS_{IN}$, while the contents being shifted out of forward register 1602 to an immediately older forward register are denoted $MT_{OUT}$, $V_{OUT}$, and $TAGS_{OUT}$.

The validity bit V for each forward register 1602 is updated each transaction cycle according to $$V = V\overline{X + SV_{IN}} \qquad (4)$$

Each forward controller 1414 copies TAGS, V, and M from its forward register 1602 into its delay buffer 1606 every transaction cycle. M is the address of the request station 1412. Each forward controller 1414 also copies X and S into its delay buffer 1606 every transaction cycle. Each delay buffer 1606 imposes a predetermined delay on its contents that is equal to the known predetermined time that elapses between sending a memory transaction to a memory track 804 and receiving a corresponding result from that memory track 804.

Each transaction cycle, an $X_{DEL}$, $V_{DEL}$, $S_{DEL}$, $M_{DEL}$ and $TAGS_{DEL}$ emerge from delay buffer 1606. $X_{DEL}$ is X delayed by delay buffer 1606. $V_{DEL}$ is V delayed by delay buffer 1606. $S_{DEL}$ is S delayed by delay buffer 1606. When $X_{DEL}$ is set, reverse register 1604 receives a result $Result_{IN}$ selected according to $M_{DEL}$ from a memory track 804, and a $TAGS_{DEL}$, $V_{DEL}$ and $S_{DEL}$ from delay buffer 1606, the known predetermined period of time after sending the corresponding memory transaction from forward register 1602 to that memory track 804.

Each transaction cycle, reverse controller 1416 generates a signal $G_{OUT}$ where $$G_{OUT} = V_{DEL} G_{IN} \qquad (5)$$

where $G_{OUT}$ is used by a younger reverse register as $G_{IN}$ and $G_{IN}=1$ for the oldest reverse register.

A reverse register 1604 sends its contents (a result $Result_{OUT}$ and a tag TAGS) to switch crossbar 810 when $$\overline{V_{DEL}} G_{IN} = 1 \qquad (6)$$

Each reverse controller 1416 shifts into its reverse register 1604 the contents of an immediately younger reverse register when:

$$S_{DEL} = 1 \qquad (7)$$

The contents of each reverse register include a result Result, a tag $TAGS_{DEL}$, and delayed validity bit $V_{DEL}$. Referring to FIG. 16, the result being shifted into reverse register 1604 from an immediately younger reverse register is denoted $R_{IN}$, while the result being shifted out of reverse register 1604 to an immediately older reverse register is denoted $R_{OUT}$.

Memory Arbitration

Figure 17:
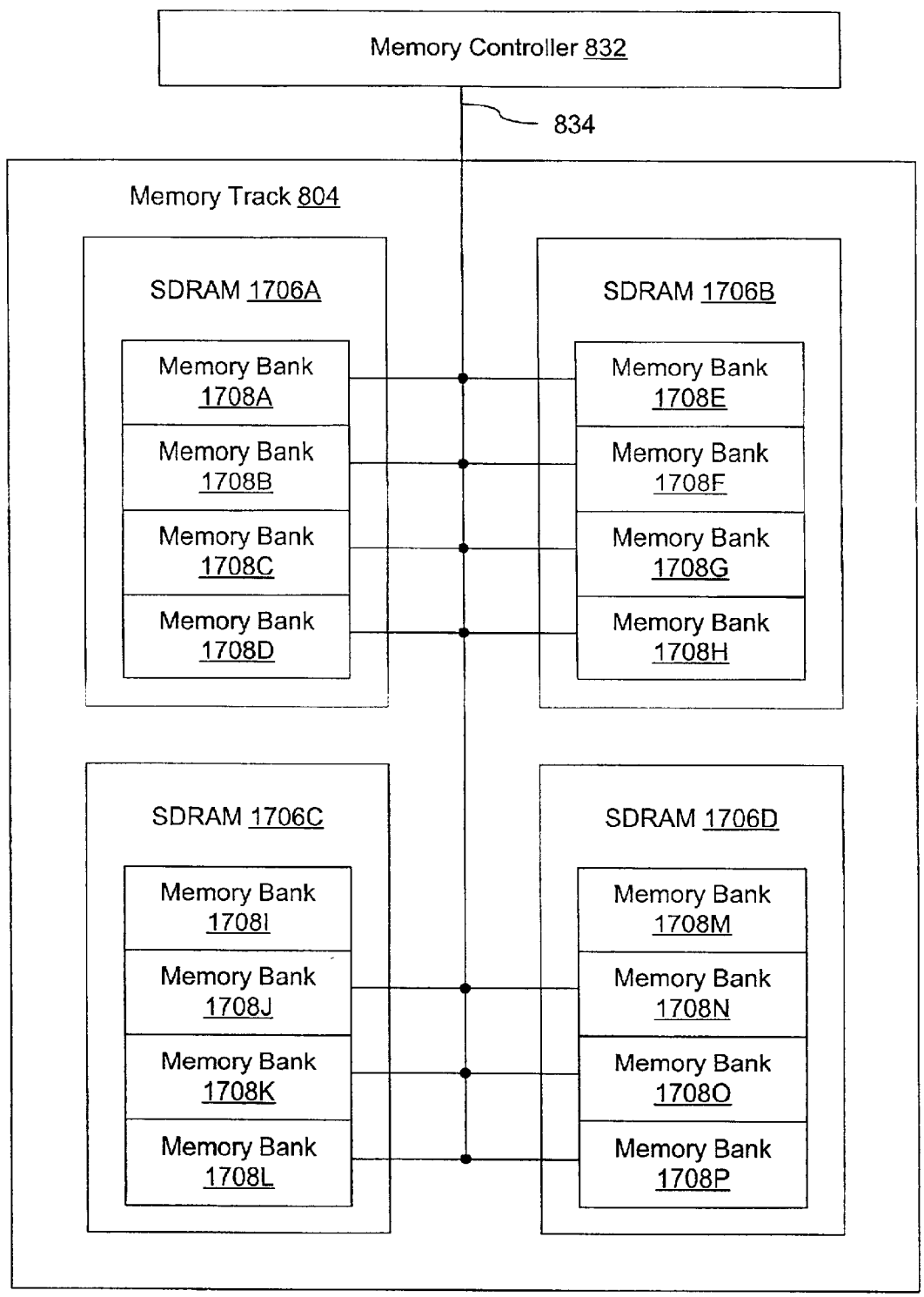
FIG. 17 depicts a memory track according to one implementation.

Each memory controller 832 controls a memory track 804 over a memory bus 834. Referring to FIG. 17, each memory track 804 includes four SDRAMs 1706A, 1706B, 1706C, and 1706D. Each SDRAM 1706 includes four memory banks 1708. SDRAM 1706A includes memory banks 1708A, 1708B, 1708C, and 1708D. SDRAM 1706B includes memory banks 1708E, 1708F, 1708G, and 1708H. SDRAM 1706C includes memory banks 1708I, 1708J, 1708K, and 1708L. SDRAM 1706D includes memory banks 1708M, 1708N, 1708O, and 1708P.

The SDRAMs 1706 within a memory track 804 operate in pairs to provide a double-wide data word. For example, memory bank 1708A in SDRAM 1706A provides the least-significant bits of a data word, while memory bank 1708E in SDRAM 1706B provides the most-significant bits of that data word.

Memory controller 832 operates efficiently to extract the maximum bandwidth from memory track 804 by exploiting two features of SDRAM technology. First, the operations of the memory banks 1708 of a SDRAM 1706 can be interleaved in time to hide overhead such as precharge and access time. Second, the use of autoprecharge makes the command and data traffic equal. For an SDRAM, an eight-byte transfer operation requires two commands (activate and read/write) and two data transfers (four clock phases).

Figure 18:
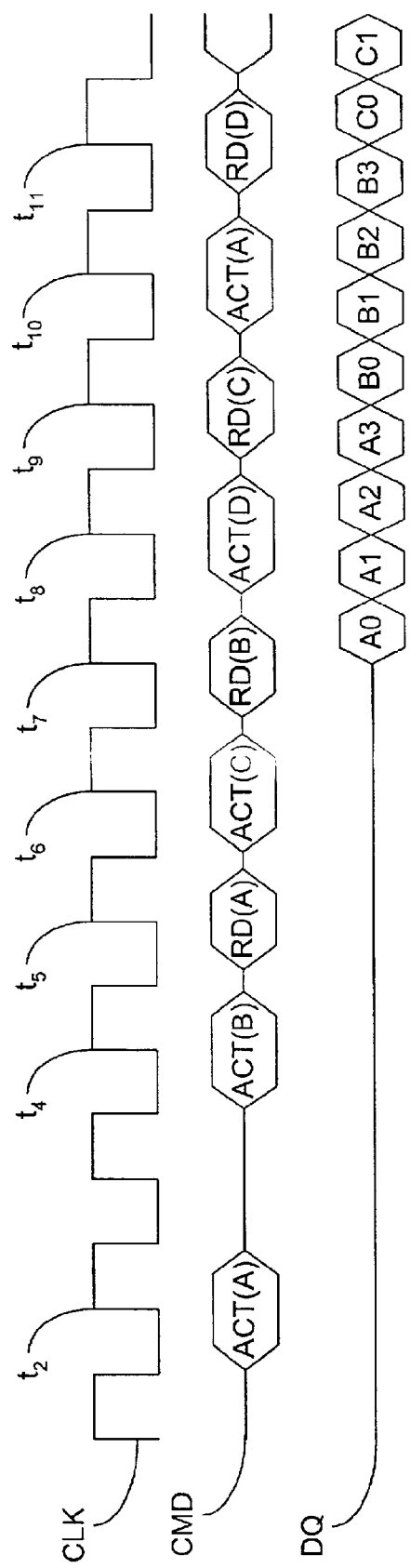
FIG. 18 depicts three timelines for an example operation of an SDRAM according to one implementation.

FIG. 18 depicts three timelines for an example operation of SDRAM 1706A. A clock signal CLK operates at a frequency compatible with SDRAM 1706A. A command bus CMD transports commands to SDRAM 1706A across memory bus 834. A data bus DQ transports data to and from SDRAM 1706A across memory bus 834.

FIG. 18 depicts the timing of four interleaved read transactions. The interleaving of other commands such as write commands will be apparent to one skilled in the relevant arts after reading this description. SDRAM 1706A receives an activation command ACT(A) at time $t_2$. The activation command prepares bank 1708A of SDRAM 1706A for a read operation. The receipt of the activation command also begins an eight-clock period during which bank 1708A is not available to accept another activation.

During this eight-clock period, SDRAM 1706A receives a read command RD(A) at $t_5$. SDRAM 1706A transmits the data A0, A1, A2, A3 requested by the read command during the two clock cycles between times $t_7$ and $t_9$. SDRAM 1706A receives another activation command ACT(A) at time $t_{10}$.

Three other read operations are interleaved with the read operation just described. SDRAM 1706A receives an activation command ACT(B) at time $t_4$. The activation command prepares bank 1708B of SDRAM 1706A for a read operation. The receipt of the activation command also begins an eight-clock period during which bank 1708B is not available to accept another activation.

During this eight-clock period, SDRAM 1706A receives a read command RD(B) at $t_7$. SDRAM 1706A transmits the data B0, B1, B2, B3 requested by the read command during the two clock cycles between times $t_9$ and $t_{11}$.

SDRAM 1706A receives an activation command ACT(C) at time $t_6$. The activation command prepares bank 1708C of SDRAM 1706A for a read operation. The receipt of the activation command also begins an eight-clock period during which bank 1708C is not available to accept another activation.

During this eight-clock period, SDRAM 1706A receives a read command RD(C) at $t_9$. SDRAM 1706A transmits the data C0, C1, and so forth, requested by the read command during the two clock cycles beginning with $t_{11}$.

SDRAM 1706A receives an activation command ACT(D) at time $t_8$. The activation command prepares bank 1708D of SDRAM 1706A for a read operation. The receipt of the activation command also begins an eight-clock period during which bank 1708D is not available to accept another activation.

During this eight-clock period, SDRAM 1706A receives a read command RD(D) at $t_{11}$. SDRAM 1706A transmits the data requested by the read command during two subsequent clock cycles in a manner similar to that describe above. As shown in FIG. 18, three of the eight memory banks 1708 of a memory track 804 are unavailable at any given time, while the other five memory banks 1708 are available.

Figure 19:
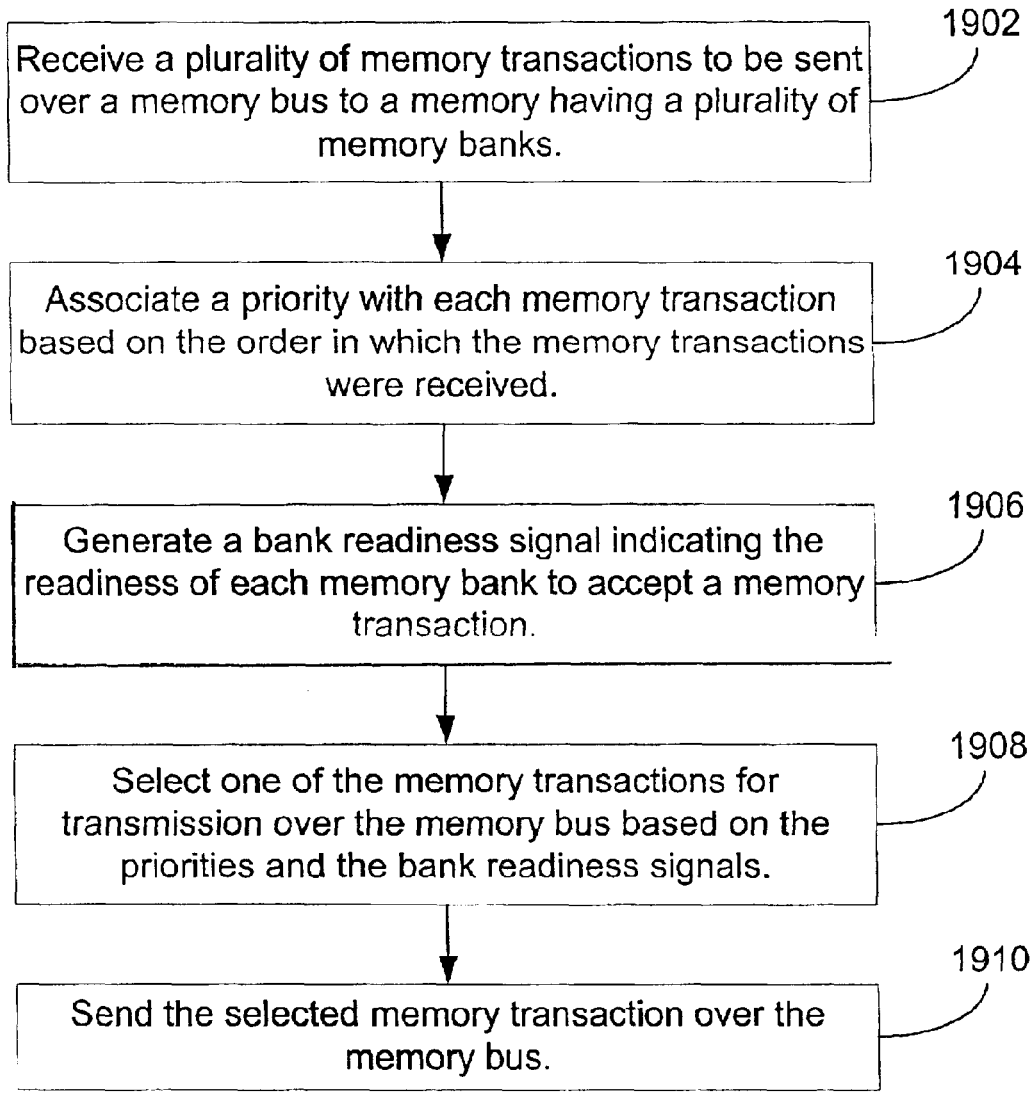
FIG. 19 is a flowchart depicting an example operation of a memory crossbar in sending memory transactions to a memory track based on the availability of memory banks within the memory track according to one implementation.

FIG. 19 is a flowchart depicting an example operation of memory crossbar 812 in sending memory transactions to a memory track 804 based on the availability of memory banks 1708. As described above, each input port 850 within memory crossbar 812 receives a plurality of memory transactions to be sent over a memory bus 834 to a memory track 804 having a plurality of memory banks 1708 (step 1902). Each memory transaction is addressed to one of the memory banks. However, each memory bus 834 is capable of transmitting only one memory transaction at a time.

Each input port 850 associates a priority with each memory transaction based on the order in which the memory transactions were received at that input port 850 (step 1904). In one implementation priorities are associated with memory transactions through the use of forward queue 1404 described above. As memory transactions age, they progress from the top of the queue (request station 1412A) towards the bottom of the queue (request station 1412F). The identity of the request station 1412 in which a memory transaction resides indicates the priority of the memory transaction. Thus the collection of the request stations 1412 within an input port 850 constitutes a set of priorities where each memory transaction has a different priority in the set of priorities.

Arbiter 1506 generates a signal BNKRDY for each request station 1412 based on the availability to accept a memory transaction of the memory bank 1508 to which the memory transaction within that request station 1412 is addressed (step 1906). This information is passed to arbiter 1506 as part of the AGE signal, as described above. Each BNKRDY signal tells the request station 1412 whether the memory bank 1708 to which its memory transaction is addressed is available.

Arbiter 1506 includes a state machine or the like that tracks the availability of memory banks 1708 by monitoring the addresses of the memory transactions gated to memory controller 832. When a memory transaction is sent to a memory bank 1708, arbiter 1506 clears the BNKRDY signal for that memory bank 1708, thereby indicating that that memory bank 1708 is not available to accept a memory transaction.

After a predetermined period of time has elapsed, arbiter 1506 sets the BNKRDY signal for that memory bank 1708, thereby indicating that that memory bank 1708 is available to accept a memory transaction.

As described above, the BNKRDY signal operates to filter the memory transactions within request stations 1412 so that only those memory transactions addressed to available memory banks 1708 are considered by arbiter 1406 for presentation on internal bus 848. Also as described above, arbiter 1506 selects one of the memory transactions presented on internal bus 848 using a fairness scheme. Thus memory crossbar 812 selects one of the memory transactions for transmission over memory bus 834 based on the priorities and the bank readiness signals (step 1908). Finally, memory crossbar 812 sends the selected memory transaction over memory bus 834 to memory tracks 804 (step 1910).

Tag Generator

As mentioned above, the pair of tag generators associated with a bus are configured to independently generate the same tags in the same order. For example, tag generators 1102 and 1202 are associated with bus 822, and tag generators 1302 and 1402 are associated with bus 828.

In one implementation, the tag generators are buffers. The buffers are initialized by loading each buffer with a set of tags such that both buffers contain the same tags in the same order and no tag in the set is the same as any other tag in the set. In One implementation each buffer is a first-in, first-out (FIFO) buffer. In that implementation, tags are removed by "popping" them from the FIFO, and are returned by "pushing" them on to the FIFO.

In another implementation, each of the tag generators is a counter. The counters are initialized by setting both counters to the same value. Each tag is an output of the counter. In one implementation, the counter is incremented each time a tag is generated. If results return across a bus in the same order in which the corresponding memory transactions were sent across the bus, then the maximum count of the counter can be set to account for the maximum number of places (such as registers and the like) that a result sent across a bus and the corresponding memory transaction returning across the bus can reside.

However, if results do not return across a bus in the same order in which the corresponding memory transactions were sent across the bus, a control scheme is used. For example, each count can be checked to see whether it is still in use before generating a tag from that count. If the count is still in use, the counter is frozen (that is, not incremented) until that count is no longer in use. As another example, a count that is still in use can be skipped (that is, the counter is incremented but a tag is not generated from the count). Other such implementations are contemplated.

In another implementation, the counters are incremented continuously regardless of whether a tag is generated. In this way, each count represents a time stamp for the tag. The maximum count of each counter is set according to the maximum possible round trip time for a result and the corresponding memory transaction. In any of the counter implementations, the counters can be decremented rather than incremented.

Figure 20:
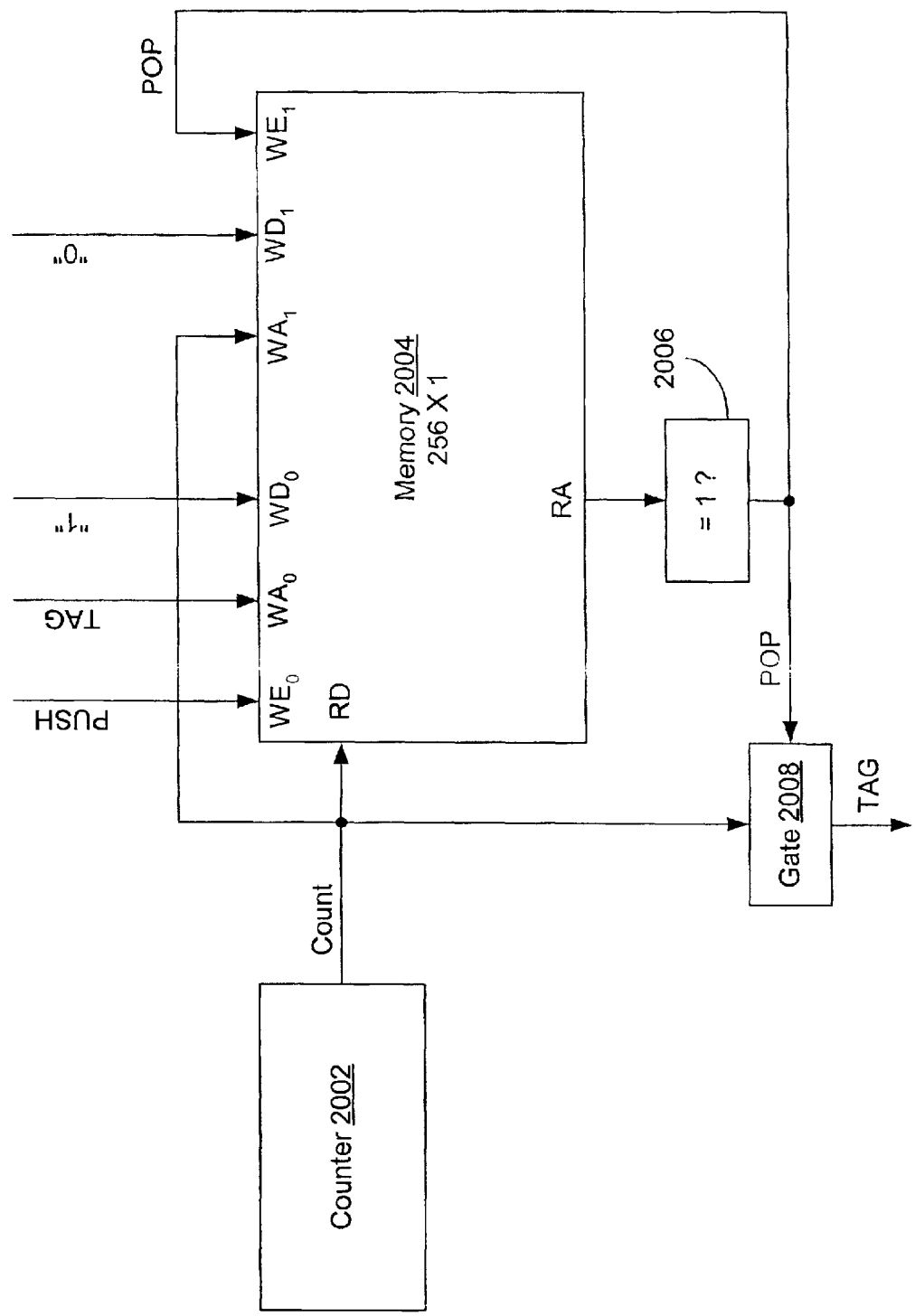
FIG. 20 depicts a tag generator according to one implementation.

In another implementation, depicted in FIG. 20, each of the tag generators includes a counter 2002 and a memory 2004. Memory 2004 is a two-port memory that is one bit wide. The depth of the memory is set according to design requirements, as would be apparent to one skilled in the relevant arts. The contents of memory 2004 are initialized to all ones before operation.

The read address (RA) of memory 2004 receives the count output of counter 2002. In this way, counter 2002 "sweeps" memory 2004. The data residing at each address is tested by a comparator 2006. A value of "1" indicates that the count is available for use as a tag. A value of "1" causes comparator 2006 to assert a POP signal. The POP signal causes gate 2008 to gate the count out of the tag generator for use as a tag. The POP signal is also presented at the write enable pin for port one (WE1) of memory 2004. The write data pin of port one (WD1) is hardwired to logic zero ("0"). The write address pins of port one receive the count. Thus when a free tag is encountered that tag is generated and marked "in-use."

When a tag is returned to the tag generator, its value is presented at the write address pins for port zero (WA0), and a PUSH signal is asserted at the write enable pin of port zero (WE0). The write data pin of port zero (WD0) is hardwired to logic one ("1"). Thus when a tag is returned to the tag generator, that tag is marked "free."

Figure 21:
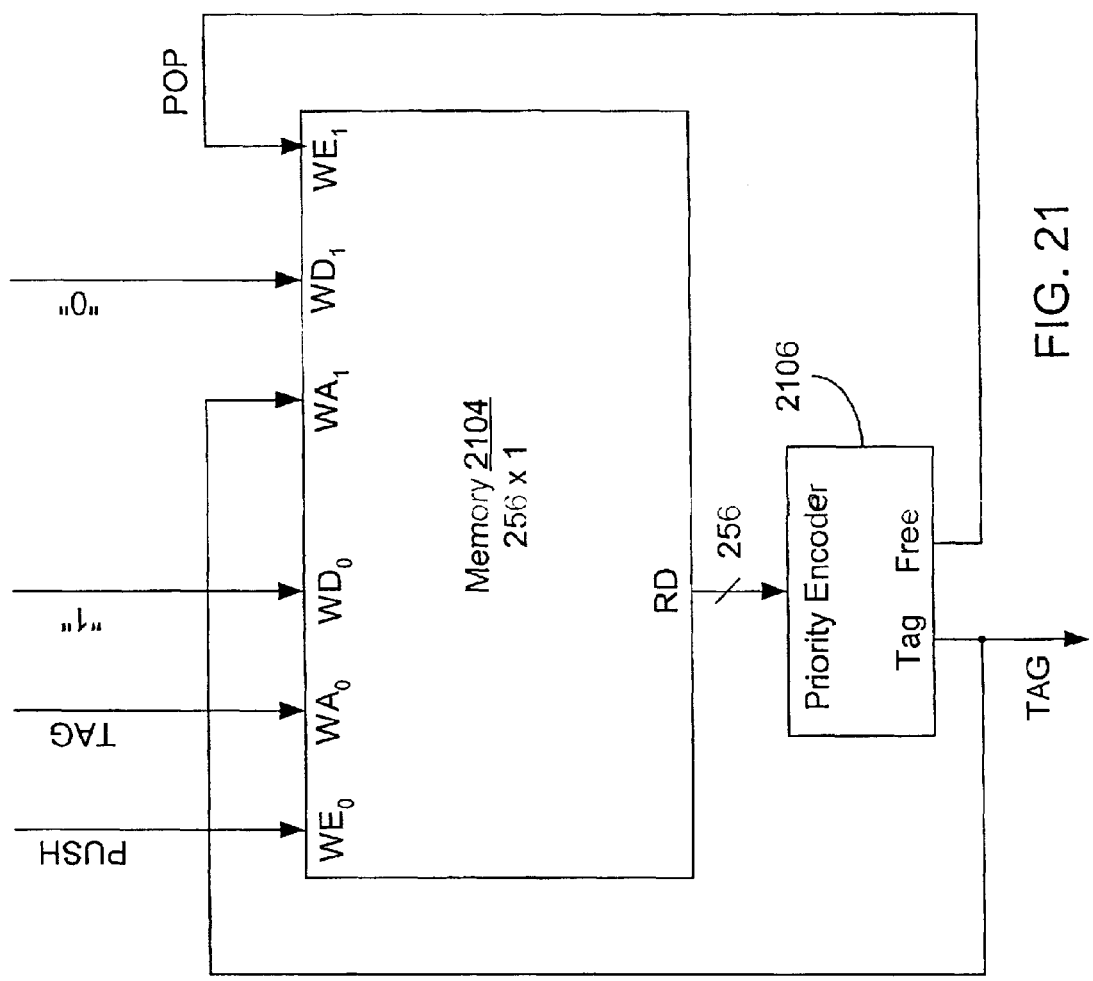
FIG. 21 depicts a tag generator according to another implementation.

In another implementation, shown in FIG. 21, comparator 2006 is replaced by a priority encoder 2106 that implements a binary truth table where each row represents the entire contents of a memory 2104. Memory 2104 writes single bits at two write ports $WD_0$ and $WD_1$, and reads 256 bits at a read port RD. Memory 2104 is initialized to all zeros. No counter is used.

One of the rows is all logic zeros, indicating that no tags are free. Each of the other rows contains a single logic one, each row having the logic one in a different bit position. Any bits more significant than the logic one are logic zeros, and any bits less significant than the logic one are "don't cares" ("X"). Such a truth table for a 1×4 memory is shown in Table 1.

TABLE 1

| RD | Free? | Tag |
|---|---|---|
| 0000 | No | none |
| 1XXX | Yes | 00 |
| 01XX | Yes | 01 |
| 001X | Yes | 10 |
| 0001 | Yes | 11 |

The read data from read port RD is applied to priority encoder 2106. If a tag is free, the output of priority encoder 2106 is used as the tag.

In the above-described implementations of the tag generator, a further initialization step is employed. A series of null operations (noops) is sent across each of busses 822 and 828. These noops do not cause the tag generators to generate tags. This ensures that when the fist memory transaction is sent across a bus, the pair of tag generators associate with that bus generates the same tag for that memory transaction.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:

identifying an address portion of a first message in an address slice of a switch, the first message associated with a first priority, the address portion of the first message including a first routing portion specifying a network resource;

identifying an address portion of a second message in the address slice, the second message associated with a second priority, the address portion of the second message including a second routing portion specifying the same network resource;

identifying a non-address portion of the first message in a non-address slice of the switch;

identifying a non-address portion of the second message in the non-address slice, wherein neither of the non-address portions includes a routing portion specifying the network resource;

selecting, independently in each slice, the same one of either the first message or the second message as a selected message, based on the first and second priorities;

transferring the address portion of the selected message to the network resource specified by the routing portion of the address portion of the selected message;

sending the routing portion of the address portion of the selected message from the address slice to the non-address slice; and transferring the non-address portion of the selected message to the network resource specified by the routing portion of the address portion of the selected message.

2. The method of claim 1, further comprising:

associating the first and second priorities with the first and second messages based on the ages of the first and second messages.

3. The method of claim 1, further comprising:

dividing each message to create the address portions and non-address portions;

sending the address portions to the address slice; and sending the non-address portions to the non-address slice.

4. The method of claim 1, wherein the network resource is a memory resource.

5. The method of claim 1, further comprising:

sending the selected address portion to a further address slice; and sending the selected non-address portion to a further non-address slice.

6. The method of claim 1, wherein the network resource is a processor.

7. The method of claim 1, wherein the network resource is a crossbar.

8. A method for use in an address slice of a switch having the address slice and a non-address slice, comprising:

identifying an address portion of a first message, the first message associated with a first priority, the address portion of the first message including a first routing portion specifying a network resource, wherein a non-address portion of the first message resides in a non-address slice of the switch;

identifying an address portion of a second message, the second message associated with a second priority, the address portion of the second message including a second routing portion specifying the same network resource, wherein a non-address portion of the second message resides in the non-address slice, wherein neither of the non-address portions includes a routing portion specifying the network resource;

in a first of the two slices, selecting a selected message from either the first message or the second message based on the first and second priorities, wherein the selected message is also selected by the second of the two slices independently independently of the first of the two slices;

transferring the address portion of the selected message to the network resource specified by the routing portion of the address portion of the selected message; and sending the first and second routing portions from the address slice to the non-address slice, wherein the non-address slice sends the non-address portion of the selected message to the network resource specified by the routing portion of the address portion of the selected message.

9. A method for use in a non-address slice of a switch having the non-address slice and an address slice, comprising:

identifying a non-address portion of a first message, the first message associated with a first priority, wherein an address portion of the first message resides in an address slice of the switch, the address portion of the first message including a first routing portion specifying a network resource;

identifying a non-address portion of a second message, the second message associated with a second priority, wherein an address portion of the second message resides in the address slice, the address portion of the second message including a second routing portion specifying the same network resource, wherein neither of the non-address portions includes a routing portion specifying the network resource;

in the address slice, selecting as a selected message one of the two messages based on the priorities, wherein the non-addres slice independently selects the same selected message from the two messages receiving the first and second routing portions from the address slice; and transferring the non-address portion of the selected message to the network resource specified by the routing portion of the address portion of the selected message; and wherein the address slice sends the address portion of the selected message to the network resource specified by the routing portion of the address portion of the selected message.

10. A method comprising:

identifying a first portion of a first message in a first slice of a switch, the first message associated with a first priority, the first portion of the first message including a first routing portion;

identifying a second portion of the first message in a second slice of the switch, the second portion of the first message including a second routing portion, the first and second routing portions together specifying a network resource;

identifying a first portion of a second message in the first slice, the second message associated with a second priority, the first portion of the second message including a third routing portion;

identifying a second portion of the second message in the second slice, the second portion of the second message including a fourth routing portion, the third and fourth routing portions together specifying the network resource;

selecting, independently in each slice, the same selected message as between the first and second messages based on the first and second priorities;

transferring the one of the first and third routing portions corresponding to the selected message from the first slice to the second slice;

sending the second portion of the selected message from the second slice to the network resource specified by the combination of the one of the first and third routing portions corresponding to the selected message and the one of the second and fourth routing portions corresponding to the selected message;

transferring the one of the second and fourth routing portions corresponding to the selected message from the second slice to the first slice; and sending the first portion of the selected message from the first slice to the network resource specified by the combination of the one of the first and third routing portions corresponding to the selected message and the one of the second and fourth routing portions corresponding to the selected message.

11. The method of claim 10, further comprising:

associating the first and second priorities with the first and second messages based on the ages of the first and second messages.

12. The method of claim 10, further comprising:

dividing each message to create the first and second portions;

sending the first portions to the first slice; and sending the second portions to the second slice.

13. The method of claim 10, wherein the network resource is a memory resource.

14. The method of claim 10, wherein the network resource is a processor.

15. The method of claim 10, wherein the network resource is a crossbar.

16. A method for use in a first slice of a switch having first and second slices, comprising:

identifying a first portion of a first message in the first slice, the first message associated with a first priority, the first portion of the first message including a first routing portion, wherein a second portion of the first message resides in the second slice of the switch, the second portion of the first message including a second routing portion, the first and second routing portions together specifying a network resource;

identifying a first portion of a second message in the first slice, the second message associated with a second priority, the first portion of the second message including a third routing portion, wherein a second portion of the second message resides in the second slice, the second portion of the second message including a fourth routing portion, the third and fourth routing portions together specifying the network resource;

selecting either the first or the second messages based on the first and second priorities, as a message, wherein each slice performs the selecting independently of the other and the same selected message is selected by each slice;

receiving the one of the second and fourth routing portions corresponding to the selected message from the second slice;

sending the first portion of the selected message to the network resource specified by the combination of the one of the first and third routing portions corresponding to the selected message and the one of the second and fourth routing portions corresponding to the selected message; and transferring the one of the first and third routing portions corresponding to the selected message to the second slice; and wherein the second slice sends the second portion of the selected message to the network resource specified by the combination of the one of the first and third routing portions corresponding to the selected message and the one of the second and fourth routing portions corresponding to the selected message.

17. An apparatus comprising:

means for identifying an address portion of a first message in an address slice of a switch, the first message associated with a first priority, the address portion of the first message including a first routing portion specifying a network resource;

means for identifying an address portion of a second message in the address slice, the second message associated with a second priority, the address portion of the second message including a second routing portion specifying the same network resource;

means for identifying a non-address portion of the first message in a non-address slice of the switch;

means for identifying a non-address portion of the second message in the non-address slice, wherein neither of the non-address portions includes a routing portion specifying the network resource;

means for selecting, independently in each slice, the same selected message as between the first and second messages based on the first and second priorities;

means for transferring the address portion of the selected message to the network resource specified by the routing portion of the address portion of the selected message;

means for sending the routing portion of the address portion of the selected message from the address slice to the non-address slice; and means for transferring the non-address portion of the selected message to the network resource specified by the routing portion of the address portion of the selected message.

18. The apparatus of claim 17, further comprising:

means for associating the first and second priorities with the first and second messages based on the ages of the first and second messages.

19. The apparatus of claim 17, further comprising:

means for dividing each message to create the address portions and non-address portions;

means for sending the address portions to the address slice; and sending the non-address portions to the non-address slice.

20. The apparatus of claim 17, wherein the network resource is a memory resource.

21. The apparatus of claim 17, further comprising:

means for sending the selected address portion to a further address slice; and means for sending the selected non-address portion to a further non-address slice.

22. The apparatus of claim 17, wherein the network resource is a processor.

23. The apparatus of claim 17, wherein the network resource is a crossbar.

24. An apparatus for use in an address slice of a switch having the address slice and a non-address slice, comprising:

means for identifying an address portion of a first message, the first message associated with a first priority, the address portion of the first message including a first rotating portion specifying a network resource, wherein a non-address portion of the first message resides in a non-address slice of the switch;

means for identifying an address portion of a second message, the second message associated with a second priority, the address portion of the second message including a second routing portion specifying the same network resource, wherein a non-address portion of the second message resides in the non-address slice, wherein neither of the non-address portions includes a routing portion specifying the network resource;

means for selecting one of the first or second messages, as a selected message, based on the first and second priorities, wherein each slice performs the selecting independently of the other slice and selects the same selected message;

means for transferring the address portion of the selected message to the network resource specified by the routing portion of the address portion of the selected message; and means for sending the first and second routing portions from the address slice to the non-address slice, wherein the non-address slice sends the non-address portion of the selected message to the network resource specified by the routing portion of the address portion of the selected message.

25. An apparatus for use in a non-address slice of a switch having the non-address slice and an address slice, comprising:

means for identifying a non-address portion of a first message, the first message associated with a first priority, wherein an address portion of the first message resides in an address slice of the switch, the address portion of the first message including a first routing portion specifying a network resource;

means for identifying a non-address portion of a second message, the second message associated with a second priority, wherein an address portion of the second message resides in the address slice, the address portion of the second message including a second routing portion specifying the same network resource, wherein neither of the non-address portions includes a routing portion specifying the network resource;

means for selecting as a selected message the first or second messages based on the first and second priorities, wherein each slice independently selects the same selected message;

means for receiving the first and second routing portions from the address slice; and means for transferring the non-address portion of the selected message to the network resource specified by the routing portion of the address portion of the selected message; and wherein the address slice sends the address portion of the selected message to the network resource specified by the routing portion of the address portion of the selected message.

26. An apparatus comprising:

means for identifying a first portion of a first message in a first slice of a switch, the first message associated with a first priority, the first portion of the first message including a first routing portion;

means for identifying a second portion of the first message in a second slice of the switch, the second portion of the first message including a second routing portion, the first and second routing portions together specifying a network resource;

means for identifying a first portion of a second message in the first slice, the second message associated with a second priority, the first portion of the second message including a third routing portion;

means for identifying a second portion of the second message in the second slice, the second portion of the second message including a fourth routing portion, the third and fourth routing portions together specifying the network resource;

means for selecting, independently in each slice, the same selected message from among the first and second messages based on the first and second priorities;

means for transferring the one of the first and third routing portions corresponding to the selected message from the first slice to the second slice;

means for sending the second portion of the selected message from the second slice to the network resource specified by the combination of the one of the first and third routing portions corresponding to the selected message and the one of the second and fourth routing portions corresponding to the selected message;

means for transferring the one of the second and fourth routing portions corresponding to the selected message from the second slice to the first slice; and means for sending the first portion of the selected message from the first slice to the network resource specified by the combination of the one of the first and third routing portions corresponding to the selected message and the one of the second and fourth routing portions corresponding to the selected message.

27. The apparatus of claim 26, further comprising:

means for associating the first and second priorities with the first and second messages based on the ages of the first and second messages.

28. The apparatus of claim 26, further comprising:

means for dividing each message to create the first and second portions;

means for sending the first portions to the first slice; and means for sending the second portions to the second slice.

29. The apparatus of claim 26, wherein the network resource is a memory resource.

30. The apparatus of claim 26, wherein the network resource is a processor.

31. The apparatus of claim 26, wherein the network resource is a crossbar.

32. An apparatus for use in a first slice of a switch having first and second slices, comprising:

means for identifying a first portion of a first message in the first slice, the first message associated with a first priority, the first portion of the first message including a first routing portion, wherein a second portion of the first message resides in the second slice of the switch, the second portion of the first message including a second routing portion, the first and second routing portions together specifying a network resource;

means for identifying a first portion of a second message in the first slice, the second message associated with a second priority, the first portion of the second message including a third routing portion, wherein a second portion of the second message resides in the second slice, the second portion of the second message including a fourth routing portion, the third and fourth routing portions together specifying the network resource;

means for selecting a selected message from among the first and second messages based on the first and second priorities, wherein the same selected message is selected in each slice independently of the other slices;

means for receiving the one of the second and fourth routing portions corresponding to the selected message from the second slice;

means for sending the first portion of the selected message to the network resource specified by the combination of the one of the first and third routing portions corresponding to the selected message and the one of the second and fourth routing portions corresponding to the selected message; and means for transferring the one of the first and third routing portions corresponding to the selected message to the second slice; and wherein the second slice sends the second portion of the selected message to the network resource specified by the combination of the one of the first and third routing portions corresponding to the selected message and the one of the second and fourth routing portions corresponding to the selected message.

* * * * *

UNITED STATES PATENT AND TRADEMARK OFFICE
CERTIFICATE OF CORRECTION

PATENT NO. : 6,970,454 B1
DATED : November 29, 2005
INVENTOR(S) : Purcell et al.

It is certified that error appears in the above-identified patent and that said Letters Patent is hereby corrected as shown below:

Column 29,
Line 8, change "independently independently" to -- independently --.
Line 37, change "non-addres" to -- non-address --.
Line 44, insert a paragraph break between "and" and "wherein".

Column 30,
Line 55, change "messages" to -- message --.
Line 56, change "priorities," to -- priorities --.
Line 56, change "as a message," to -- as a selected message, --.

Column 32,
Line 6, change "rotating" to -- routing --.
Lines 49-50, change "the first or second" to -- the first message or second --.
Line 50, change "messages" to -- message --.

Signed and Sealed this

Twenty-first Day of February, 2006

JON W. DUDAS
*Director of the United States Patent and Trademark Office*